United States Patent
Caldera

(10) Patent No.: US 9,852,427 B2
(45) Date of Patent: Dec. 26, 2017

(54) SYSTEMS AND METHODS FOR SANCTION SCREENING

(71) Applicant: IDM Global, Inc., Palo Alto, CA (US)

(72) Inventor: Jose Caldera, Palo Alto, CA (US)

(73) Assignee: IDM GLOBAL, INC., Palo Alto, CA (US)

( * ) Notice: Subject to any disclaimer, the term of this patent is extended or adjusted under 35 U.S.C. 154(b) by 0 days.

(21) Appl. No.: 14/938,593

(22) Filed: Nov. 11, 2015

(65) Prior Publication Data

US 2017/0132635 A1    May 11, 2017

(51) Int. Cl.
   G06Q 20/40    (2012.01)
   G06Q 30/00    (2012.01)
   G06N 7/00     (2006.01)
   G06Q 20/06    (2012.01)
   G06Q 20/38    (2012.01)

(52) U.S. Cl.
   CPC ......... *G06Q 20/4016* (2013.01); *G06N 7/005* (2013.01); *G06Q 20/065* (2013.01); *G06Q 20/381* (2013.01); *G06Q 2220/00* (2013.01)

(58) Field of Classification Search
   None
   See application file for complete search history.

(56) References Cited

U.S. PATENT DOCUMENTS

| | | | |
|---|---|---|---|
| 5,963,915 A | 10/1999 | Kirsch | |
| 6,021,397 A | 2/2000 | Jones et al. | |
| 6,047,268 A | 4/2000 | Bartoli et al. | |
| 6,076,068 A | 6/2000 | DeLapa et al. | |
| 6,336,099 B1 | 1/2002 | Barnett et al. | |
| 6,351,812 B1 | 2/2002 | Datar et al. | |
| 6,571,339 B1 | 5/2003 | Danneels et al. | |
| 6,691,915 B1 | 2/2004 | Thaxton et al. | |
| 6,862,575 B1 | 3/2005 | Anttila et al. | |
| 6,954,732 B1 | 10/2005 | DeLapa et al. | |
| 7,290,278 B2 | 10/2007 | Cahill et al. | |
| 7,356,507 B2 | 4/2008 | Bezos et al. | |
| 8,639,629 B1 | 1/2014 | Hoffman | |
| 9,471,920 B2 | 10/2016 | Kolkowitz et al. | |
| 2001/0024785 A1 | 9/2001 | Keinath et al. | |
| 2002/0059130 A1 | 5/2002 | Cheng et al. | |

(Continued)

OTHER PUBLICATIONS

Fabian Monrose and Aviel D. Rubin, Keystroke Dynamics as a Biometric for Authentication, Mar. 1, 1999, 15 pages.

(Continued)

*Primary Examiner* — Robert R Niquette
*Assistant Examiner* — Joseph W King
(74) *Attorney, Agent, or Firm* — Greenberg Traurig, LLP

(57) ABSTRACT

In some examples, a computerized sanction screening system may include an automated system for collection of sanction information, and a routine for analyzing additional available data related to sanction information entities. The system may also include an automated analysis summary routine for creating condensed information subsets or graphlets containing relevant information about sanction entities, some of which can be entities themselves, organized in a data retrieval system, such that an automated transaction system can check data from transactions and automatically identify and flag potentially sanctioned transactions. Then upon exceeding a preset contextual limit, a potential blocking warning is issued.

6 Claims, 22 Drawing Sheets

(56) References Cited

U.S. PATENT DOCUMENTS

| | | |
|---|---|---|
| 2002/0099649 A1 | 7/2002 | Lee et al. |
| 2003/0149603 A1 | 8/2003 | Ferguson et al. |
| 2003/0163691 A1 | 8/2003 | Johnson |
| 2003/0187759 A1 | 10/2003 | Arthus et al. |
| 2004/0010472 A1 | 1/2004 | Hilby et al. |
| 2004/0117302 A1 | 6/2004 | Weichert et al. |
| 2004/0199462 A1 | 10/2004 | Starrs |
| 2005/0278542 A1 | 12/2005 | Pierson et al. |
| 2006/0031116 A1 | 2/2006 | Bogasky et al. |
| 2006/0184428 A1 | 8/2006 | Sines et al. |
| 2006/0282660 A1 | 12/2006 | Varghese et al. |
| 2007/0022058 A1 | 1/2007 | Labrou et al. |
| 2007/0220595 A1 | 9/2007 | M'raihi et al. |
| 2008/0010678 A1 | 1/2008 | Burdette et al. |
| 2008/0040275 A1 | 2/2008 | Paulsen et al. |
| 2008/0046334 A1 | 2/2008 | Lee et al. |
| 2008/0077515 A1 | 3/2008 | Zoldi et al. |
| 2008/0140576 A1 | 6/2008 | Lewis et al. |
| 2009/0048953 A1 | 2/2009 | Hazel et al. |
| 2009/0089869 A1 | 4/2009 | Varghese |
| 2010/0094765 A1 | 4/2010 | Nandy |
| 2010/0138340 A1 | 6/2010 | Shirey et al. |
| 2010/0228580 A1 | 9/2010 | Zoldi et al. |
| 2010/0293094 A1 | 11/2010 | Kolkowitz et al. |
| 2011/0251951 A1 | 10/2011 | Kolkowitz et al. |
| 2013/0024364 A1 | 1/2013 | Shrivastava et al. |
| 2014/0283026 A1 | 9/2014 | Striem Amit et al. |
| 2015/0081549 A1* | 3/2015 | Kimberg ............ G06Q 20/4016 705/44 |
| 2015/0220928 A1 | 8/2015 | Allen |
| 2015/0287026 A1 | 10/2015 | Yang |
| 2015/0310424 A1* | 10/2015 | Myers ................ G06Q 20/3678 705/69 |
| 2015/0324802 A1 | 11/2015 | Kolkowitz et al. |
| 2015/0332256 A1 | 11/2015 | Minor |
| 2015/0363876 A1 | 12/2015 | Ronca |
| 2016/0063500 A1 | 3/2016 | Sherlock et al. |
| 2016/0071108 A1 | 3/2016 | Caldera et al. |
| 2016/0104163 A1* | 4/2016 | Aquino .................. G06Q 40/12 705/44 |
| 2016/0203575 A1* | 7/2016 | Madhu ................ G06Q 50/265 705/319 |
| 2016/0371693 A1 | 12/2016 | Kolkowitz et al. |
| 2017/0132636 A1 | 5/2017 | Caldera |
| 2017/0140386 A1 | 5/2017 | Kolkowitz et al. |

OTHER PUBLICATIONS

Fighting Fraud in today's Connected World, Entrust Jul. 2009.
Transaction Assessment and/or Authentication, U.S. Appl. No. 12/776,784, filed May 10, 2010 Dan Kolkowitz, et al Publications—Issue Fee Payment Verified Sep. 9, 2016.
Transaction Assessment and/or Authentication, U.S. Appl. No. 14/801,086, filed Jul. 16, 2015 Dan Kolkowitz, et al Abandoned—Failure to Respond to an Office Action Feb. 11, 2017.
Transaction Assessment and/or Authentication, U.S. Appl. No. 15/255,034, filed Sep. 1, 2016 Dan Kolkowitz, et al Docketed New Case—Ready for Examination Oct. 18, 2016.
Transaction Assessment and/or Authentication, U.S. Appl. No. 15/255,034, filed Jan. 25, 2017 Dan Kolkowitz, et al Prosecution Suspended Apr. 20, 2017.
Anti-fraud Even Correlation, U.S. Appl. No. 13/085,819, filed Apr. 13, 2011 Dan Kolkowitz, et al Prosecution Suspended Apr. 20, 2017.
Enhanced Automated Acceptance of Payment Transactions That Have Been Flagged for Human Review by an Anti-fraud System, U.S. Appl. No. 14/845,613, filed Sep. 4, 2015 Kieran Sherlock, et al Docketed New Case—Ready for Examination Feb. 27, 2017.
Enhanced Automated Anti-fraud and Anti-money-laundering Payment System, U.S. Appl. No. 14/846,169, filed Sep. 4, 2015 Jose Caldera, et al Non Final Action Mailed Jan. 3, 2017.
Systems and Methods for Detecting Relations Between Unknown Merchants and Merchants with a Known Connection to Fraud, U.S. Appl. No. 14/949,305, filed Nov. 23, 2015 Jose Caldera Docketed New Case—Ready for Examination Mar. 25, 2017.
Systems and Methods to Authenticate Users and/or Control Access Made by Users on a Computer Network Using Identity Services, U.S. Appl. No. 15/464,141 Jose Caldera, et al Application Undergoing Preexam Processing Mar. 20, 2017.
Systems and Methods to Authenticate Users and/or Control Access Made by Users on a Computer Network Based on Scanning Elements for Inspection According to Changes Made in a Relation Graph, U.S. Appl. No. 15/464,153 Jose Caldera, et al Application Undergoing Preexam Processing Mar. 20, 2017.
Systems and Methods to Authenticate Users and/or Control Access Made by Users on a Computer Network Using a Graph Score, U.S. Appl. No. 15/464,193 Jose Caldera, et al Application Undergoing Preexam Processing Mar. 20, 2017.
What is Bitcoin? Barski, et al., Bitcoin for the befuddled, 2014.
Transaction Assessment and/or Authentication, U.S. Appl. No. 12/776,874, filed May 10, 2010 Dan Kolkowitz, et al Publications—Issue Fee Payment Verified Sep. 9, 2016.
Transaction Assessment and/or Authentication, U.S. Appl. No. 14/801,086, filed Jul. 16, 2015 Dan Kolkowitz, et al Final Rejection Mailed May 18, 2016.
Anti-fraud Event Correlation, U.S. Appl. No. 13/085,819, filed Apr. 13, 2011 Dan Kolkowitz, et al Response to Non-Final Office Action Entered and Forwarded to Examiner Aug. 23, 2016.
Enhanced Automated Acceptance of Payment Transactions That Have Been Flagged for Human Review by an Anti-fraud System, U.S. Appl. No. 14/845,613, filed Sep. 4, 2015 Kieran Sherlock, et al Non Final Action Mailed Jun. 21, 2016.
Enhanced Automated Anti-fraud and Anti-money-laundering Payment System, U.S. Appl. No. 14/846,169, filed Sep. 4, 2015 Jose Caldera, et al Docketed New Case—Ready for Examination Sep. 9, 2016.
Systems and Methods for Detecting Relations Between Unknown Merchants and Merchants with a Known Connection to Fraud, U.S. Appl. No. 14/949,305, filed Nov. 23, 2015 Jose Caldera Non Final Office Action Mailed Jun. 14, 2016.

* cited by examiner

SYSTEMS AND METHODS FOR SANCTION SCREENING

DEFINITIONS

Cryptocurrency. A cryptocurrency is a medium of exchange designed around securely exchanging information over a computerized network, which is a process made possible by certain principles of cryptography. The first cryptocurrency to begin trading was Bitcoin in 2009. Since then, numerous cryptocurrencies have been created. Fundamentally, cryptocurrencies are specifications regarding the use of currency which seek to incorporate principles of cryptography to implement a distributed, decentralized and secure information economy.

Bitcoin. Bitcoin is a peer-to-peer payment system introduced as open-source software in 2009 by developer Satoshi Nakamoto. The payments in the system are recorded in a public ledger using its own unit of account, which is also called Bitcoin. The Bitcoin system has no central repository and no single administrator, which has led the US Treasury to call Bitcoin a decentralized virtual currency. Although its status as a currency is disputed, media reports often refer to Bitcoin as a cryptocurrency or digital currency.

FIAT money. FIAT money is money which derives its value from government regulation or law. It differs from commodity money, which is based on a good, often a precious metal such gold or silver, which has uses other than as a medium of exchange. The term derives from the Latin fiat ("let it be done", "it shall be").

BACKGROUND

The present disclosure is directed to transaction assessment and/or authentication systems and methods and, more particularly, to systems and methods for assessing and/or authenticating transactions to identify fraudulent payments.

Many payment transaction anti-fraud systems provide a result to the merchant of either
- Accepting the transaction
- Rejecting the transaction
- Manually reviewing the transaction The first two results typically result in an automated response to the initiator of the transaction, either an acceptance of the payment or a rejection respectively.

FIG. 9 shows an exemplary payment transaction anti-fraud system 900, of the type that are currently in use. Such systems provide a score as the result of evaluation (910). Similarly, one range of scores would typically result in an automated acceptance (920), with another range resulting in an automated rejection of the payment (930). The transactions in the middle grey area would require further manual review (940).

The evaluation of transactions that are categorized as requiring further manual review is time consuming and error prone. On average in online commerce 20 percent of transactions require manual review. The manual review cost is estimated to be in average more than 50 percent of the overall expenditure in anti-fraud activities. The more this review process can be automated the higher the efficiencies and benefits.

Bitcoin transactions are by definition pseudo-anonymous (see en.wikipedia.org/wiki/Cryptocurrency). This means that fundamentally two users can transfer Bitcoins to each other without revealing the identity of either of them. Instead the transaction is cryptographically signed to ensure that the transaction took place, and there is a public record of such transaction that can be verified by all players on the Bitcoin infrastructure.

If either of these users wanted to exchange their Bitcoins to FIAT currency (or FIAT money) they would have to use a Bitcoin Exchange or a Bitcoin Wallet-hosting company that enables exchanging Bitcoins into FIAT currency.

In the United States, and other countries, governmental bodies regulate this exchange. In these countries, Bitcoin Exchanges are required by law to capture information about the users, usually encompassed within an activity known as "Know your Customer" or KYC. Furthermore organizations/individuals that enable exchanging Bitcoins for FIAT currency, and vice versa are also required to monitor "financial" transactions for potential money laundering activity. Problems arising out of this new cryptocurrency technology operating over a global computer network include challenges of auditing the exchanging of Bitcoins and other cryptocurrencies into one another and also into (or between) so-called FIAT money or FIAT currency (en.wikipedia.org/wiki/Fiat money) and vice versa for compliance with anti-money laundering and suspicious activity, such as fraud.

SUMMARY

Exemplary embodiments may include systems and methods for assessing and authenticating transactions are disclosed. Some exemplary embodiments may authenticate transactions based at least in part on a comparison of a newly obtained electronic signature associated with a user with a previously obtained electronic signature associated with the user, where a payment instrument presented for use in the transaction is also associated with the user. Exemplary electronic signatures may comprise any information which may identify the user, such as browser fingerprints, computer fingerprints, IP addresses, geographic IP location information, information associated with a payment, and/or a typing patterns.

In an aspect, an exemplary system may uniquely identify a user using the network and payment attributes presented in the regular contexts of payment transactions. Attributes may include browser fingerprints, computer fingerprints, IP addresses, geo-IP location information, information entered regularly on payment, the typing pattern when entering fields in the payment information. Such information may comprise an electronic signature and may uniquely identify a user across merchants and payment networks. In some exemplary embodiments, only when enough information is available to identify the user is the user known through his or her electronic signature.

In an aspect, an exemplary system may positively recognize a user through his or her payment and/or network behavior to approve transactions on the basis of being the known good user of a payment instrument.

In an aspect, an exemplary method may include collecting the history data of charges, entered information, and summary data on those transactions being accepted or rejected to build a database that becomes part of an electronic signature for a user.

In an aspect, an exemplary method may include using hashes of attributes collected in a transaction that can be stored at a central location and/or may be used in a positive system to uniquely identify known users to a collection of merchants and payment networks. The hashes may not be reversed to extract personal information, which may allow cooperation between merchants and payment entities without compromising customer information.

In an aspect, an exemplary method may include explicitly identifying a user on first use of a payment instrument for the purpose of collecting an electronic signature for use in subsequent network transactions.

In an aspect, an exemplary method may include a check of an electronic signature on a transaction for the purpose of detecting whether the user is the same or not as a requirement for acceptance of a card-not-present transaction.

In an aspect, an exemplary method of detecting identity theft may include the use of an electronic signature to recognize the use of a card by a different user than the one to whom it was issued.

In an aspect, an exemplary method may include using a payment through a known trusted source as establishing a base reputation for a user with an electronic signature for a merchant or a collection of merchants not affiliated with the trusted source. For example, verification made through a trusted online retailer may be used to establish that the user was recognized and able to pay through those services, and may give an increased level of confidence that the user is known accurately to the service.

In an aspect, a computer-readable medium may computer-executable instructions stored thereon, which, when executed by a computer, enable the computer to perform a method including storing a first electronic signature associated with a user, the first electronic signature including a plurality of attributes collected in connection with a prior transaction; associating the first electronic signature with a payment instrument utilized in the prior transaction; receiving a second electronic signature in connection with a proposed transaction utilizing the payment instrument; determining whether the second electronic signature correlates with the first electronic signature by comparing the second electronic signature with the first electronic signature; if the second electronic signature correlates with the first electronic signature, confirming that the payment instrument and the second electronic signature are associated with one another; and if the second electronic signature does not correlate with the first electronic signature, determining that the payment instrument and the second electronic signature are not associated with one another.

In detailed embodiment, the plurality of attributes may include at least one of a browser fingerprint, a computer fingerprint, an IP address, geographic IP location information, information associated with a payment, a typing pattern, user name, user billing address, user shipping address, user phone number, email address, and account name. In a detailed embodiment, comparing the second electronic signature with the first electronic signature may include comparing individual attributes collected in connection with the proposed transaction to corresponding ones of the plurality of attributes collected in connection with the prior transaction. In a detailed embodiment, determining whether the second electronic signature correlates with the first electronic signature may be based at least in part upon a trust score calculated using a weighted consideration of at least some of the plurality of attributes collected in connection with the prior transaction. In a detailed embodiment, the weighted consideration may include calculating the trust score based at least in part upon matching attributes, non-matching attributes, attributes not compared, and a maximum possible trust score.

In a detailed embodiment, determining whether the second electronic signature correlates with the first electronic signature may include calculating a trust score based at least in part upon at least one of a reputation score associated with the payment instrument, a reputation score associated with a computer utilized in the proposed transaction, and a reputation score associated with the user.

In a detailed embodiment, the browser fingerprint may include at least one of a user agent, a screen resolution, a software plug-in, a time zone, a system language, whether Java is enabled, whether cookies are enabled, a site visited, and an IP address. In a detailed embodiment, the computer fingerprint may include at least one of a processor characteristic, a memory size of the machine, a value that is loaded at a key location, a value of a registry of a loaded operating system, an Ethernet MAC address, raw networking information, network information, a loaded program, and a log file. In a detailed embodiment, the network information may include a network provider, whether an IP address is consistent with a known IP address, a geographical proximity of an address registered with a payment instrument and the IP address as determined by an IP to geo-location service, whether or not a proxy is in use, whether a known bad IP address is in use, and whether the IP address is associated with a service provider who was associated with the user in the prior transaction.

In an aspect, a computer-readable medium may include computer-executable instructions stored thereon, which, when executed by a computer, enable the computer to perform a method including receiving a received electronic signature including a plurality of received attributes and information pertaining to a payment instrument; determining whether the received electronic signature correlates with any of a plurality of stored electronic signatures by comparing the plurality of received attributes of the received electronic signature to a plurality of stored attributes associated with the plurality of stored electronic signatures; if the received electronic signature correlates with one of the plurality of stored electronic signatures, determining whether the payment instrument is associated with the one of the plurality of stored electronic signatures based at least in part upon at least one prior transaction involving the one of the plurality of stored electronic signatures and the payment instrument and if the payment instrument is associated with the one of the plurality of stored electronic signatures, confirming an association between the payment instrument and the received electronic signature; and if the received electronic signature does not correlate with one of the plurality of stored electronic signatures, determining that the payment instrument is not associated with the received electronic signature.

In a detailed embodiment, the information pertaining to the payment instrument may include a credit card number.

In a detailed embodiment, the plurality of received attributes may include at least one of a browser fingerprint, a computer fingerprint, an IP address, geographic IP location information, information associated with a payment, a typing pattern, user name, user billing address, user shipping address, user phone number, email address, and account name. In a detailed embodiment, the browser fingerprint may include at least one of a user agent, a screen resolution, a software plug-in, a time zone, a system language, whether Java is enabled, whether cookies are enabled, a site visited, and an IP address. In a detailed embodiment, the computer fingerprint may include at least one of a processor characteristic, a memory size of the machine, a value that is loaded at a key location, a value of a registry of a loaded operating system, an Ethernet MAC address, raw networking information, network information, a loaded program, and a log file. In a detailed embodiment, the network information may include a network provider, whether an IP address is consistent with a known IP address, a geographical proximity of an address registered with a payment instrument and the IP address as determined by an IP to geo-location service, whether or not a proxy is in use, whether a known bad IP address is in use, and whether the IP address is associated with a service provider who was associated with the user in the prior transaction.

In a detailed embodiment, determining whether the received electronic signature correlates with any of the plurality of stored electronic signatures may include determining which ones of the plurality of received attributes match stored attributes associated with individual stored electronic signatures. In a detailed embodiment, determining whether the received electronic signature correlates with any of the plurality of stored electronic signatures may include calculating a trust score based at least in part upon which ones of the plurality of received attributes match stored attributes associated with individual stored electronic signatures. In a detailed embodiment, calculating the trust score may include applying different weights to different ones of the plurality of received attributes. In a detailed embodiment, calculating the trust score may be based at least in part upon a reputation score. In a detailed embodiment, the method may include, if the trust score is below a first predetermined threshold, determining that the payment instrument is not associated with the received electronic signature; if the trust score is between the first predetermined threshold and a second predetermined threshold, determining that the payment instrument is associated with the received electronic signature at a low confidence level; and if the trust score is above the second predetermined threshold, determining that the payment instrument is associated with the received electronic signature at a high confidence level.

In an aspect, a computer-readable medium may include computer-executable instructions stored thereon, which, when executed by a computer, enable the computer to perform a method including receiving, from a user computer system, a request to utilize a payment instrument in a transaction; transmitting, to an authentication system, information pertaining to the payment instrument and a collected electronic signature including attributes associated with the user computer system; and receiving, from the authentication system, an indication of whether the collected electronic signature associated with the user computer system correlates with a stored electronic signature associated with the payment instrument obtained in connection with a previous transaction involving the user computer system and the payment instrument.

In a detailed embodiment, the attributes associated with the user computer system may include at least one of a browser fingerprint, a computer fingerprint, an IP address, geographic IP location information, information associated with a payment, a typing pattern, user name, user billing address, user shipping address, user phone number, email address, and account name.

In a detailed embodiment, the indication may include at least one of an indication corresponding to a high confidence correlation, a low confidence correlation, and no correlation. In a detailed embodiment, the method may include, if the indication corresponds to the high confidence correlation, accepting the transaction; if the indication corresponds to the low confidence correlation, initiating additional fraud detection assessment; and if the indication corresponds to no correlation, rejecting the transaction. In a detailed embodiment, the high confidence correlation may be associated with a high user match score, a known payment instrument, a known computer that have previously been used together.

The current disclosure pertains to a transaction monitoring and KYC technology specifically addressing the challenges of auditing the exchanging of Bitcoins and other cryptocurrencies into one another and also into (or between) so-called FIAT money or FIAT currency (https://en.wikipedia.org/wiki/Fiat_money) and vice versa for compliance with anti-money laundering and suspicious activity. Embodiments of the current disclosure may be used by Bitcoin and other cryptocurrency exchanges to unveil suspicious activities associated to laundering money and potentially identify the actors as well as other related attributes involved with the transactions.

A computerized anti-money-laundering and anti-fraud transaction analysis system is provided that may include a computerized cryptocurrency analysis tool system operatively coupled over a computerized network to a cryptocurrency exchange, a cryptocurrency exchange ledger and/or a know-your-customer facility. The computerized cryptocurrency analysis tool may include an automated payment cluster analysis routine for analyzing transaction data for a plurality of proposed cryptocurrency transactions. The transaction data for the plurality of proposed cryptocurrency transactions may be obtained from the cryptocurrency exchange, cryptocurrency ledger and/or the know-your-customer facility. The automated payment cluster analysis routine automatically identifies a cluster of related transactions in the plurality of proposed cryptocurrency transactions based upon an analysis of a plurality of transaction data items associated with each of the proposed cryptocurrency transactions. The computerized cryptocurrency analysis tool may also include automated summary routine for flagging a first transaction in the identified cluster as potentially associated with at fraud and/or money-laundering upon at least one of: (a) determining at least one of the transaction data items in the cluster of related transactions is contained on a blacklist, (b) determining that at least one of the transaction data items in the cluster of related transactions is contained on a suspicious list and a transaction cryptocurrency amount is over a predetermined threshold, (c) determining that at least one of the transaction data items in the cluster of related transactions is contained on a suspicious list and a number of connections between the cluster of related transactions is over a predetermined threshold, and (d) determining that at least one of the transaction data items in the cluster of related transactions is contained on a suspicious list and a number of cryptocurrency transfers associated with the cluster of related transactions is over a predetermined threshold.

In a more detailed embodiment, the automated summary routine flags a second transaction as accepted based upon (x) determining that none of the transaction data items in the cluster of related transactions is contained on either of a blacklist and a suspicious list, (b) determining that the transaction cryptocurrency amount is under a predetermined threshold, and/or (c) determining that the number of connections between the cluster of related transactions is under a predetermined threshold. In yet a further detailed embodiment, the summary routine flags a third transaction for manual review upon not being flagged as potentially associated with money-laundering, upon not being flagged as potentially associated with fraud, and upon not being flagged as accepted.

Alternatively, or in addition, the blacklist contains known bad electronic addresses, known bad phone numbers, and/or known bad device identifiers.

Alternatively, or in addition, the transaction data for the plurality of proposed cryptocurrency transactions is obtained from a combination of the cryptocurrency exchange, the cryptocurrency ledger and the know-your-customer facility. Alternatively, or in addition, the transaction data for the plurality of proposed cryptocurrency transactions is obtained from a plurality of cryptocurrency exchanges.

Alternatively, or in addition, the automated payment cluster analysis routine automatically identifies a cluster of related transactions in the plurality of proposed cryptocurrency transactions based upon an analysis of the plurality of transaction data items associated with each of the proposed cryptocurrency transactions, including a combination of several of the following: (i) transaction data items pertaining to a history of previous payments associated with the proposed cryptocurrency transaction, (ii) transaction data items pertaining to previous payment instruments used by an entity associated with the proposed cryptocurrency transaction, (iii) transaction data items pertaining to a current proposed payment instrument and related transactions associated with the current payment instrument, (iv) transaction data items pertaining to a current transaction device and related transactions associated with the current transaction device, (v) transaction data items pertaining to a current user account information, (vi) transaction data items pertaining to a current electronic address, (vii) transaction data items pertaining to electronic addresses associated with a current user account, (viii) transaction data items pertaining to additional transaction devices associated with the proposed cryptocurrency transaction, (iv) transaction data items pertaining to additional electronic addresses associated with the proposed cryptocurrency transaction.

BRIEF DESCRIPTION OF THE DRAWINGS

The detailed description refers to the following figures in which.

DETAILED DESCRIPTION

Figure 1:
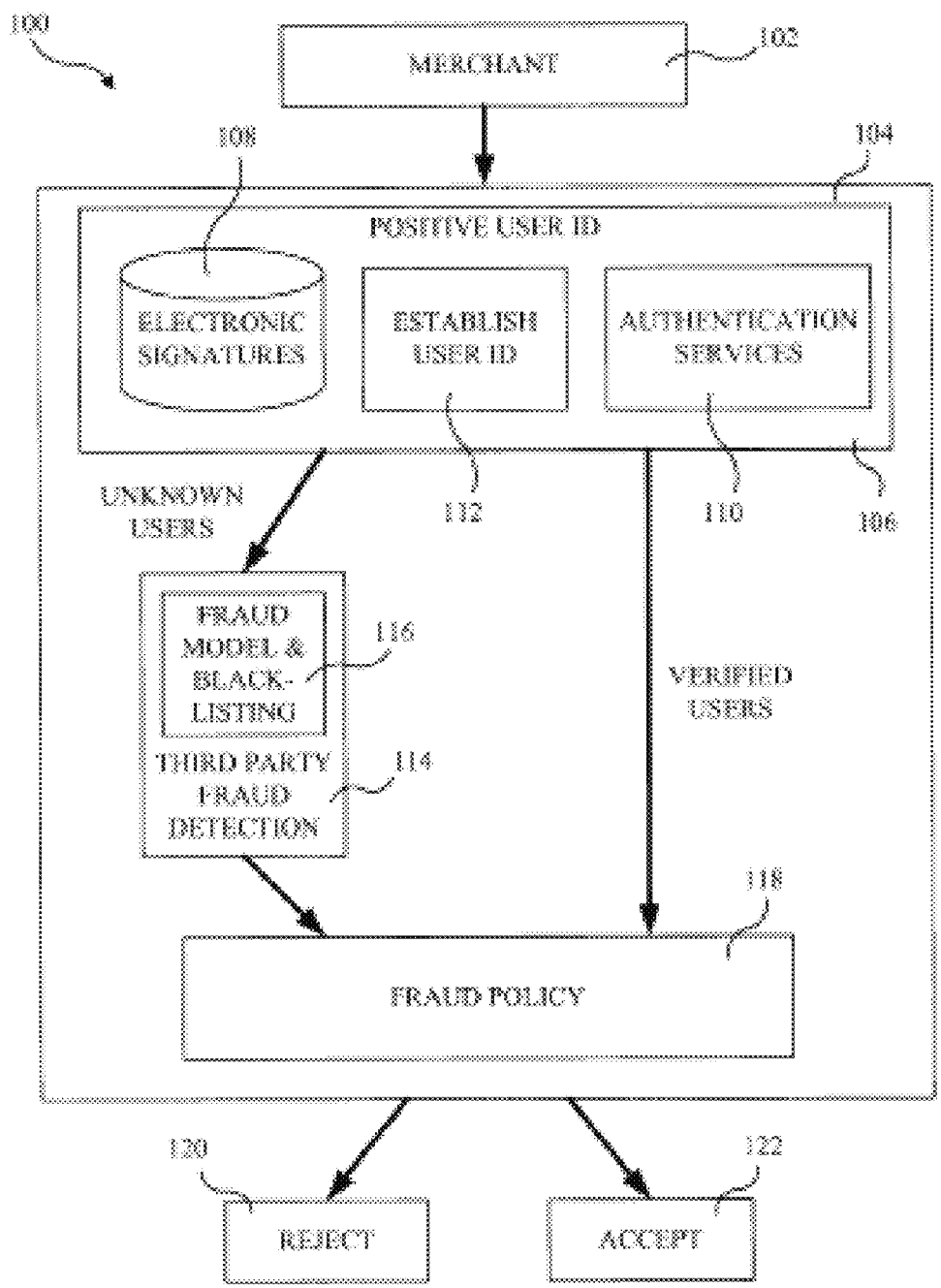
FIG. 1 is a block diagram illustrating an exemplary transaction assessment and authentication environment.

The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Embodiments of the current disclosure take information from 1) monitoring transactions as they happen on Bitcoin and cryptocurrency exchanges; 2) KYC activities when users register on Exchanges; and 3) the Blockchain. The resulting correlation of data is then used to inform money laundering heuristics and algorithms to detect suspicious activities, that otherwise would go unnoticed when only looking at a single dimension of the transactions.

Embodiments of the current disclosure establish clear correlations between the monitored activities within and across multiple Exchanges, incorporating the data accumulated when trading cryptocurrencies from FIAT, trading cryptocurrencies to FIAT, and trading in cryptocurrency, including across different cryptocurrencies.

Embodiments of the current disclosure identify "clusters" of Bitcoin (or other currency) addresses. Clusters show transactions as statistically related through analysis of the available data associated with them, thus showing that the transactions involving those Bitcoins are related. Since transactors at exchanges make the trades, the "clusters" show that the actors and actions are related to one another, for example, monitoring of metadata from transactions (txn), KYC activities and related Blockchain data.

The clusters thus can be further used as follows: When an individual is known or suspected to be involved with Money Laundering or other forms of illegal financial activities or financial fraud, then the information that is collected through the transactions can be used to identify Bitcoins through any identified clusters: When the Bitcoins (or other cryptocurrencies) belong to a cluster, then the other individuals associated to any of those Bitcoins through the information retrieved from the exchanges may be shown to be related. Accordingly, the Bitcoin entries can be used to identify other parties potentially involved in money-laundering or other forms of illegal financial activities or financial fraud.

Similarly, if a cluster is observed, first, as potentially tied to money-laundering or other forms of illegal financial activities or financial fraud (based upon, for example, the clustering algorithms), then the transaction data and/or the KYC data can be used to map to the real people submitting the transactions in the exchanges. This establishes a correlation of attributes which are seemingly unrelated. The real people doing the transactions can then be investigated as potentially being involved with the money laundering or fraud. The attributes involved with the transactions obtained via the KYC and the submitted data can be scrutinized in all transactions as then being related to questionable activities.

In some cases, a computerized anti-money-laundering payment system may comprise software for analyzing transaction data that can identify closely related payments tabulate the amounts of transfers in a cluster of closely related payments, so that if the transfers exceed a preset limit, the system issues a warning. Further, in some cases, the system executes a reputation review, which may result in flagging of a transaction cluster, and may (or may not) then accept transactions if transaction data does not link to a known bad player, bad address, or bad phone numbers and does not exceed preset limits. Also, if the system detects association with a suspect entity, the breadth of the co-related items looked at is expanded by an additional number, and if that results in more suspicious connection, a transaction is rejected and sent for manual review.

The present disclosure relates, inter alia, to methods and systems associated with transaction assessment and/or authentication and, more particularly, to assessing and/or authenticating transactions to identify fraudulent payments.

The present disclosure contemplates that transaction fraud is becoming more prevalent due, in large part, to the Internet. For example, transaction frauds may include fraudulent use of payment instruments such as credit cards, debit cards and other similar instruments. Some fraud-check systems maintain lists of known bad cards, bad addresses, and/or bad computer system fingerprints, which may be referred to as "black lists." Further, some fraud-check systems perform analytics with the bad cards, bad addresses, and/or bad computer system fingerprints to determine whether a given transaction appears legitimate. Some of these fraud-check systems also determine a risk associated with a transaction.

In some cases a computerized sanction screening system may comprise an automated system for collection of sanction information, plus a routine for analyzing additional available data related to sanction information entities. Said system may also include an automated analysis summary routine for creating condensed information subsets or graphlets containing relevant information about sanction entities, some of which can be entities themselves, organized in a data retrieval system, such that an automated transaction system can check data from transactions and automatically identify and flag potentially sanctioned transactions. Then upon exceeding a preset contextual limit, the system does not in all cases block a transaction, but issues a blocking warning, meaning the transaction needs to be further investigated, manually or automatically. Further, the computerized sanction screening system reviews a flagged transaction cluster and, if items do not contain links to a known bad entity, the system may accept the transaction. However, if the system finds reason to suspect an entity, the breadth of the co-related items looked at is expanded by an additional number, and if the system then finds one or more suspicious connections, the transaction is rejected and sent for further review, which review tries to offset a linked suspected bad entity with a preset minimum of known good entities for approval, and if that preset minimum is not reached the transaction is referred for manual review.

Some exemplary embodiments according to the present disclosure may utilize information associated with a user to develop and/or maintain an association between a user and a payment instrument. In some exemplary embodiments, transaction assessment and/or authentication systems and methods may be configured to collect information associated with a user of a payment instrument and/or to compare such newly collected information with previously collected information. Based at least in part upon the comparison of the previously collected information and the newly collected information, some exemplary systems and methods may be configured to determine whether the user is associated with the presented payment instrument. Some exemplary embodiments may be configured to maintain all or part of the information related to users' transactions over time, which may increase the level of trust in an identity matching scheme.

Some exemplary embodiments may utilize data that may be collected in transactions using Internet online payment systems for online merchants. For example, data associated with a transaction may be collected to build a representation of the user who is associated with the payment instrument used in the transaction. In some exemplary embodiments, data associated with attributes that can be seen in the network and/or the transaction that may be associated with and/or may identify a user may be analyzed and/or used to create an electronic signature of the user. Exemplary attributes include, but are not limited to, browser fingerprints, computer fingerprints, IP addresses, geographic IP location information, information associated with a payment, and/or a typing pattern when entering data in fields related to the payment. Browser fingerprints may include attributes associated with an individual's browser that may be extracted using standard interfaces. For example, browser fingerprints may include characteristics such as user agent (includes browser and operating system), screen resolution, software plug-ins (in a manageable state), time zone, system language, whether Java is enabled, whether cookies are enabled, sites visited, and/or IP address. The present disclosure contemplates that matching browser fingerprint characteristics in a subsequent interaction with those collected during a prior interaction may indicate a high probability that the same browser was used in both the prior and subsequent interactions.

Some exemplary computer fingerprints may allow a determination of whether a physical machine is the same as one that has been seen in the past. Computer fingerprints may include, for example, processor characteristics (e.g., model number, version, speed, cache size serial number, etc.), memory size of the machine, values that are loaded at key locations, values of the registry of the loaded operating system, Ethernet MAC (media access control) address, raw networking and network information (e.g., configuration parameters), loaded programs, and/or log files. Some exemplary embodiments may utilize performance on specified benchmark program fragments, such as by measuring the performance of a program that includes different characteristics including input/output and CPU (central processing unit) speed. Such an approach may take into account the other processes running on a user's machine, the amount of memory, etc., and it may provide reproducible results so that it may act as a part of a fingerprint. Example information associated with a payment may include behaviors observed on entered information (e.g., typing rhythms, billing addresses entered, cards used, passwords or PINS stored and/or requested), Zip code, full name entered, and/or loaded verses empty fields on entering information (for example, the browser may have the previously entered values from the last instance of the user). This can be seen to be entered by the browser rather than typing by the speed of entry of the characters. In some exemplary embodiments, the electronic signature may uniquely identify the user at the same merchant in future transactions and/or at other merchants where the same attributes can be seen.

In some exemplary embodiments, when a transaction is presented by a user to a merchant, data related to the user's electronic signature may be collected. The newly collected electronic signature data may be compared to previously collected electronic signature data associated with that user to determine whether or not the newly collected electronic signature correlates with the previously collected electronic signature. If the newly collected electronic signature correlates with the previously collected electronic signature, then it may be assumed that the user has been identified. If the newly collected electronic signature does not correlate with the previously collected electronic signature, then it may be assumed that the user in the present transaction is not the same user who participated in previous transactions. Thus, by associating a particular payment instrument with a known user (e.g., by identifying the user by his or her electronic signature), it may be determined whether or not the payment instrument presented in a particular transaction is known to belong to the user who is presenting the payment instrument.

In some exemplary embodiments, a lack of correlation between the newly collected electronic signature and the previously collected electronic signature may be used to identify transactions which may merit further assessment. For example, if the newly collected electronic signature correlates with a known, previously collected electronic signature of a different user (e.g., a user other than the user involved in the transaction), then the transaction may be flagged for further assessment, such as further determination of whether or not fraud is involved or whether additional fraud checks need to be performed.

In some cases, a computerized anti-fraud payment system may analyze transaction data, automatically rejecting some transactions and assigning some others for manual review while others for additional automatic review, according to a set of rules, automatically accepting some of the reviewed transactions also according to rules. The review rules may accept transactions for the following reasons:

Transaction uses prepaid cards and the bank has authorized the transaction; there is a history of the card being used with the consumer account, and there is no history of chargebacks or refunds; the address associated with the consumer's phone number matches the billing address associated with the payment and the consumer responds affirmatively to an automated phone call; the shipping address matches the address associated with the consumer's phone number; there is a positive, non fraud, match between the physical contact information provided in the transaction and a third-party service; and there is a positive, non fraud, match between the email contact information provided and the physical contact information for the transaction in a third-party service. Further, the system may be configured to filter transactions based on transaction value and type of goods prior to acceptance rules. Additionally, the system may store a user's electronic signature associated with prior transaction(s) and compare it to the electronic signature used in the transaction currently under review, and then accept or reject the transaction depending on whether the signatures match. Other elements of comparison between past and current transactions may include a browser fingerprint, a computer fingerprint, an IP address, geographic IP location information, information associated with a payment, a typing pattern, user name, user billing address, user shipping address, user phone number, email address, or account name. The browser fingerprint may include a user agent, a screen resolution, a software plug-in, a time zone, a system language, whether Java is enabled, whether cookies are enabled, a site visited, or an IP address. Similarly, the computer fingerprint may include processor characteristic, a memory size of the machine, a value that is loaded at a key location, a value of a registry of a loaded operating system, an Ethernet MAC address, raw networking information, network information, a loaded program, or a log file. And the network information may include a network provider, whether an IP address is consistent with a known IP address, geographical proximity of an address registered with a payment instrument and the IP address as determined by an IP to geo-location service, whether or not a proxy is in use, whether a known bad IP address is in use, and whether the IP address is associated with a service provider who was associated with the user in the prior transaction.

To provide additional context for various aspects of the present invention, the following discussion is intended to provide a brief, general description of a suitable computing environment in which the various aspects of the invention may be implemented. While some exemplary embodiments of the invention relate to the general context of computer-executable instructions that may run on one or more computers, those skilled in the art will recognize that the invention also may be implemented in combination with other program modules and/or as a combination of hardware and software.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is also within the scope of the disclosure that a user may enter commands and information into the computer through one or more wired/wireless input devices, for example, a touch-screen, a keyboard and a pointing device, such as a mouse. Other input devices may include a microphone (functioning in association with appropriate language processing/recognition software as know to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

The present disclosure contemplates that the notion of using an electronic signature associated with a user to identify the user in a payment network may be aided by the standardization of World Wide Web interfaces. Merchant payment interfaces often utilize standard World Wide Web technology to provide user catalogs and payment collection. This may include the input of credit card and/or other payment information through applications running on users' computers or as browser applications. Some exemplary embodiments according to the present disclosure may be configured to collect certain pieces of information for the purpose of identifying the user who is behind the payment instrument. Some of these pieces of information are not necessarily related to the transaction, but may instead relate to characteristics of the user's computer environment and/or network sessions. For example, characteristics of the user's computer environment may include browser fingerprint information and/or typing characteristics of the user. Characteristics of the network sessions may include IP address, whether or not the user is coming from a known location associated with the user, and/or whether or not the user is utilizing a network proxy. The whole collection of the information (or parts thereof) may provide a unique user electronic signature. Such an electronic signature may allow a determination of whether a particular user is associated with a particular payment instrument they are presenting.

As illustrated in FIG. 1, an exemplary transaction assessment and authentication environment 100 may include a merchant 102 submitting information pertaining to a transaction to a transaction assessment and authentication system 104. System 104 may include a positive user ID module 106, which may employ an electronic signature database 108 and/or authentication services 110 to establish a user ID 112. Users who are not positively identified (e.g., unknown users) may be subjected to one or more third party fraud detection processes 114, such as fraud model and/or black listing analyses 116. Users who are positively identified (e.g., verified users) and/or unknown users who have undergone third party fraud detection processes 114 may be evaluated under a fraud policy 118, and system 104 may provide an accept 120 or reject 122 output associated with the user.

Figure 2:
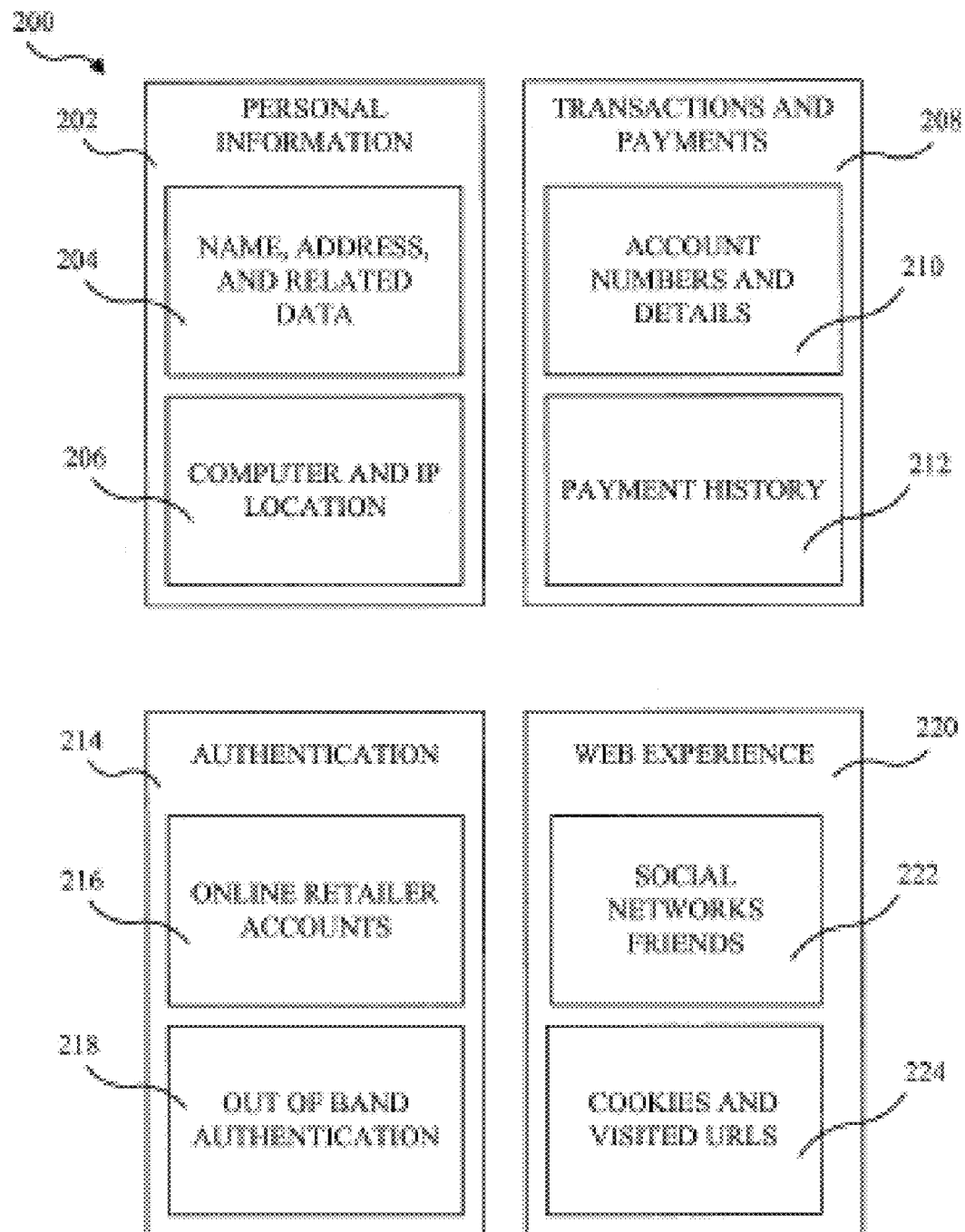
FIG. 2 is a block diagram illustrating example information which may be collected and/or utilized in electronic signatures.

FIG. 2 illustrates example information 200 which may be collected and/or utilized in electronic signatures. Personal information 202 may include a user's name, address, and related information 204 and/or computer and IP location information 206. Transactions and payments information 208 may include account numbers and details 210 and/or payment history information 212. Authentication information 214 may include information associated with online retailer accounts 216 and/or out of band authentication 218 (e.g., authentication of the user via communications channels other than the primary communications channel being used to conduct the transaction, such as authentication using a telephone for a transaction conducted via the internet).

Web experience information 220 may include social networks friends 222 and/or website-related data 224, such as cookies and/or visited URLs (uniform resource locators) associated with the user's web experience.

Some exemplary embodiments may be configured to utilize electronic signatures to identify users, or as a common component in the identification of users. In some exemplary embodiments, this may reduce or eliminate dependence upon user-supplied information to identify users. In some exemplary embodiments, the actual underlying data in an electronic signature may be less important than correlation between aspects of a newly collected electronic signature and a previously collected electronic signature.

Some exemplary embodiments may reduce the likelihood that a user's identity may be hidden. For example, some exemplary embodiments may asses the degree of correlation of a newly collected electronic signature with a previously collected electronic signature. The degree of correlation may be evaluated to determine whether such electronic signatures uniquely identify the user. If so, the electronic signature may be considered to be positive identification of the user in the transaction.

Some exemplary embodiments may use any technology to help identify a user at their computer or site using identifying attributes and/or data. Instead of (or in addition to) using technologies to generate "blacklists" (or negative lists of users with bad payment credentials), some exemplary embodiment may use attributes to help identify the user in different contexts. The present disclosure contemplates that the attributes may not necessarily identify the user completely. Cryptographic techniques may be used to store encrypted information that may be transmitted by the user. The encrypted information may assist a merchant in determining the identification of a consumer (user) using a payment instrument.

Figure 3:
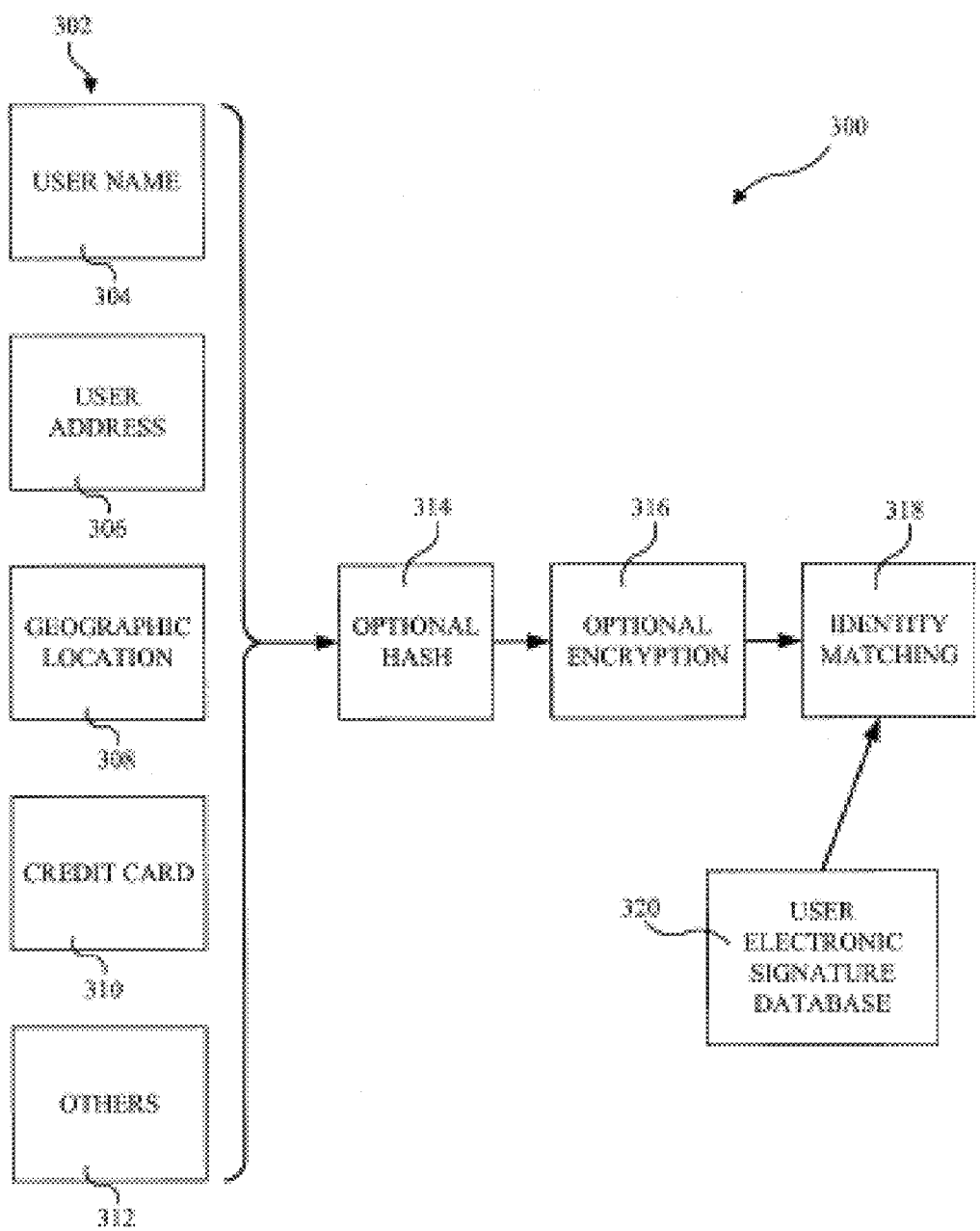
FIG. 3 is flow chart illustrating an exemplary transaction assessment and authentication method.

As illustrated in FIG. 3, some exemplary transaction assessment and authentication methods 300 may include cryptographic hashing and/or encryption of the information. For example, newly collected electronic signature information 302, such as user name 304, user address 306, geographic location 308, credit card data 310, and/or other information 312, may be run through a hash operation 314 and/or encryption operation 316 prior to conducting identity matching 318 to evaluate the correlation with a previously collected electronic signature, such as from an electronic signature database 320. In some exemplary embodiments, the original information run through the hash and/or encryption operations may not be readily obtained from the hashed and/or encrypted result. In such embodiments, the correlation of the newly collected electronic signature and the previously collected electronic signature may be performed on hashed and/or encrypted data. Thus, although the actual information making up the electronic signature may not be retrievable (e.g., only hashed and/or encrypted data may be transmitted), assessment of correlation (e.g., matching) of attributes may be performed. For example, while the geographic location of a user may not be retrievable from the hash of the geographic location data, the newly obtained hash of the user's geographic location may be compared to a previously collected hash of the user's geographic location. If the hashes match, then the newly collected and previously collected geographic locations correlate.

In some exemplary embodiments, using hashed and/or encrypted data may allow private user data to be transmitted across the Internet only in hashed and/or encrypted form, which may provide privacy advantages. In some exemplary embodiments, using hashed and/or encrypted data may allow a plurality of merchants or other parties to cooperate to reduce fraudulent transaction without divulging confidential customer information. For example, merchants or other parties may contribute hashed and/or encrypted information comprising user electronic signatures which may be used by other parties for transaction assessment through matching. However, because the information is hashed and/or encrypted, the underlying information may not be retrievable.

Some exemplary embodiments may determine whether a payment instrument belongs to a user based on network information associated with the user. For example, network information associated with the user may include the network provider, whether the IP address is consistent with the user's known IP address, the geographical proximity of the address registered with a payment instrument (e.g., credit card or payment card) and the IP address as determined by an IP to geo-location service, whether or not the user is utilizing a proxy or known bad set of IP locations as determined by a service or black list, and/or whether the IP address is associated with a service provider who was associated with the user in past transactions. In this manner, some exemplary embodiments may enable a merchant to accurately assess whether a payment instrument (such as a credit card) belongs to the user of the payment instrument or not.

Some exemplary embodiments may address a growing problem with on-line and/or Internet transaction payments. For example, when a merchant receives a user request to charge a credit card, it may be beneficial to determine whether to accept the request based on the information presented by the user. In the case of stolen credit cards, the information about the user may be stolen at the same time along with the physical and/or virtual credit card information. This information may include a name, address, phone number and other pieces of billing and/or personally identifiable information. Since each merchant may verify their own customer's data, the personal data utilized for this kind of fraudulent activity may be replicated over and over. Some exemplary embodiments may reduce problems associated with the loss of that information and verification by the merchant. For example, if the system detects that a different user is using a known payment instrument, it may alert certain parties of the possibility of identity theft. By establishing the user's identity prior to processing the transaction, some exemplary embodiments may allow Internet payments to approach card-present situations in terms of fraud prevention and trustworthiness.

In some exemplary embodiments, the systems and methods described herein may assist merchants in determining whether they should accept a credit card payment based on whether the user making the payment owns the credit card. This may provide confidence and/or information to the merchant that the user owns the credit card. Such information may be considered by the merchant before processing the credit card payment. Some exemplary embodiments may reduce the differences between transactions where the credit card is present ("card-present" transaction) and transactions where the credit is not present ("card not present" transactions) since it may help establish that the user actually owns the credit card in an analogous way to clerk asking a person for drivers license and/or other credentials by matching the name and/or other information on the credit card with the license information. This may be a useful tool for all involved parties since it tends to provide proof that a user owned the credit card, presented the credit card to the merchant and that the merchant performed the actual fraud checks. This may be better than in many "card-present" cases, as a merchant may not be able perform the required identity checks and there may be no record of whether they were performed.

Some exemplary embodiments may determine whether the payment requesting user is the same user who actually owns the card, instead of asking if a user's credentials are bad (e.g., whether they are on a blocked list, or are coming from known bad computer systems, etc.). This may be accomplished using much of the same data. But, the data may be transmitted to the authentication system to determine whether it is the same data that has been associated with the use of the card on an authentication network. In this manner, the authentication system may help determine whether it is the user that actually owns the payment instrument (as opposed to merely whether the transaction may be risky). This may provide much better user authentication than the explicit password-based authentication methods that are used in some systems today. Some exemplary embodiments may produce a trust level (or score) indicating how close the user requesting a current payment is to the known users of the card. A trust score may weight matching elements to provide a high score for matching of all elements and a very low or medium score for instances in which there are partially matching or non-matching elements.

In some exemplary embodiments, a trust score may be calculated as follows. A set of candidate users may be identified base on known existing good users of the payment instrument presented, known existing users of the computer from which the payment request is being made, users who have made purchases through the merchant account currently requesting payment, users sharing the same email address, and/or other criteria that find candidate users with a reasonable probability of matching the user requesting payment. For each of the candidate users, the attributes of the current payment request may be compared with the attributes of the candidate user to determine which candidate user, if any, is best matched by the current payment request. In some exemplary embodiments, the attributes may include user name, user billing address, user shipping address, user phone numbers (mobile, work, home, fax, etc.), user typing rhythms, email address, merchant account name. For purposes of matching, each of these attributes may be given a weight that reflects how strongly the presence of the attribute identifies the user. An exemplary table of user attribute weights follows:

| Attribute | Weight (0-100) |
|---|---|
| User Name | 10 |
| User Billing Address | 10 |
| User Shipping Address | 30 |
| User Phone number | 10 |
| User Typing rhythm | 50 |
| User email address | 20 |
| User merchant account name | 10 |

An overall match score may be calculated for each of the candidate users as follows. The weights of all of the attributes that matched may be summed and designated, "matchWeight." The weights of all of the attributes that did not match may be summed and designated "missWeight." The weights of all of the attributes of the candidate user may be summed and designated "maxPossible." The weights of all of the attributes of the candidate user that were not present in the current payment request may be summed and designated "notInRequest."

In some exemplary embodiments, the match score may be given by the following expression:

$$(matchWeight^2-(missWeight*2)-notInRequest)*1000/maxPossible^2$$

The best-matched user may be the candidate user with the highest match score.

In some exemplary embodiments, individual known cards, computers, and users within the authentication system may have individual reputation scores that may be determined by the history of payments involving that entity. For example, a user that has been involved in many successful transactions over a long period of time, none of which have been subsequently reversed due to fraud, may have a high reputation score. Similarly, a user that has been the subject of fraudulent transaction reversals (e.g., chargebacks) may have a low reputation score.

The trust score of the user that is requesting payment may be a function of the user match score, the reputation score of the user, payment instrument, and computer involved in the payment request, and/or the strength of any existing relationships between the payment instrument and computer.

The following exemplary algorithm illustrates how these inputs can be used to calculate a trust score for the payment requesting user:

1. If User match score is high AND payment instrument is known AND computer is known AND all have good reputations AND all have been used together THEN trust score=VERY GOOD
2. If user, payment instrument, or computer have a low reputation then trust score=BAD
3. If user match score low AND payment instrument is known AND computer is known AND all have good reputations AND all have been used together THEN trust score=GOOD
4. Otherwise trust score=SUSPICIOUS A trust score may be used, for example, to determine how much scrutiny to apply to the transaction from a fraud analysis perspective. For example, if a user's trust score is VERY GOOD or GOOD then only limited resources may to be applied to this user's transaction. Similarly if a user's trust score is BAD then the transaction may be rejected without further analysis. However if a user's trust score is SUSPICIOUS then this may be a transaction that deserves closer inspection.

In some exemplary embodiments, accumulating the transactions performed by users may improve the accuracy of these scores over time.

Some exemplary embodiments may reduce problems associated with stolen credit cards used on the Internet (e.g. when a user presents a credit card to a merchant, the merchant may ask if the user owns the credit card, and, if not, then merchant must perform more checks to determine if the credit card is stolen). If the user is known to the authentication system, then the merchant may know that the credit card is being used legitimately. If the user is not known to the authentication system, then the merchant may make a separate determination of the riskiness of the transaction (e.g., by checking black lists). Thus, some exemplary embodiments may reduce the frequency of checking the black lists in many cases, since most transactions are in fact legitimate.

In some exemplary embodiments, the authentication system may operate in a computer network environment as follows. The merchant may embed a code in their applications which may take data from the user's environment and pass it across to the authentication system. For example, such data from the user's environment may include the same data as the browser fingerprint as described above. In the user's browser, an encrypted cookie may store any data that is passed to the authentication system. The encrypted cookie may also store user's information that has been previously known. In one embodiment, the user may not see the data, as it may only be a credential that gets transmitted to the authentication system. Some exemplary embodiments may compare the previous values with the values that are passed across in the active session. If an application operates outside of the browser, the routines may use the same protocol, but assemble their own cookie outside of the browser cookie facilities and cache.

Further, in some exemplary embodiments, a central server may receive requests from merchants. An application programming interface (API) may send the cookie together with the network information for the user. This may include all the components of the API which may be gathered by the embedded code. When the user presents the information to the authentication system through the API, they may include the cookie (which may include past behavior and/or local information). If information in the cookie does not match the current information, then a message may be provided that the user cannot be identified and/or authenticated. In such a case, a user may be identified by the authentication system by a number of different methods. The methods may lead to the same or similar corroborating information.

In some exemplary embodiments, transactions may occur with merchants, issuers and/or any entity that the user might want to present the payment instrument to. When a user presents a payment instrument to a merchant (for example), the merchant may request assistance from the authentication system to determine whether the user is the same user who has used the payment instrument in the past. In contacting the authentication system, the user may transmit data associated with the user's computer system and/or network connection (including an IP address, for example). The authentication system may utilize this data to make a determination as to whether the user is the same user who has used the same payment instrument in the past.

In some exemplary embodiments, the payment instrument issuer may set up a policy so that when a user presents the payment instrument, a check may be performed to confirm that the user's information matches the policy for the user identified as owning the payment instrument. Otherwise, the user may be deemed not authenticated.

In some exemplary embodiments, a merchant (for example) may collect data from the connection according to a policy that may be provided by the central authority. The user may not know what information to collect, nor may they give any information about themselves except network information that is being transmitted and information that may be gathered from the network connection. The authentication system may analyze whether the payment instrument information is coming from the user or another entity. If the merchant has implemented authentication system algorithms for identifying the user, then it may be determined with near certainty that it is the user. Otherwise, a result may be returned that indicates that positive identification of the user cannot be determined. Future transactions may then be known with relative certainty.

In some exemplary embodiments, a set of APIs may collect information related to the behavior of the user involved with the transaction. This may be deemed a "fingerprint" of the user. The fingerprint may be used as part of the electronic signature of the user.

In some exemplary embodiments, when a merchant is asked to accept payment for a transaction, they may ask the authentication system whether this is the same user as defined by the issuer/authority for the payment instrument. The merchant may not make any determination of whether the payment should be taken. Instead, the authentication system may determine whether the user owns the payment instrument, and if the payment should be accepted. Based, at least in part, on the user's information (including network information, for example), the decision may be made whether this is the same user that owns this payment instrument as has been seen in the past on the Internet. If the user has registered with the payment instrument issuer, the determination of whether the user is the actual owner of the credential may be easily effectuated. The merchant may not know anything about the user beyond what they know through accepting the payment instrument. There is no identity of the user that is transmitted around the authentication system. Thus, some exemplary embodiments may maintain privacy of all users in the system while verifying their ownership of their payment credentials through matching their electronic signatures.

In some exemplary embodiments, a method to determine the identity of a user through use of network signatures may be provided. An exemplary network signature may include information known about the browser or computer environment, the IP address, networking locations that the user is known to come from, and/or the total history of the user's behavior. The network signature for a user may provide a unique identity in various contexts. This method may include weighing components of the network characteristics gathered through a user's activity on the Internet.

In some exemplary embodiments, the algorithm to calculate a trust score for a payment requesting user described above may be adapted to identify the user via their network characteristics by substituting attributes of the user's network signature for user attributes. An exemplary table of network characteristic attribute weights follows:

| Attribute | Weight (0-100) |
| --- | --- |
| PC Fingerprint | 80 |
| Browser Fingerprint | 50 |
| IP Address | 20 |
| IP Geolocation | 10 |
| Browser Geolocation | 40 |

Such a method may provide a proof of identity at the time of a transaction. In some exemplary embodiments, the method may be implemented in an embedded Java applet.

In some exemplary embodiments, the authentication system and/or method may provide payment integration with security features. Such embodiments may provide details and/or reports related to transactions, and may correlate security information with user data.

In some exemplary embodiments, an authentication system may provide fraud checks together with transaction data for a user. This may include a set of APIs that allow a merchant to plug in the payment instruments and/or accounts together with order information and/or payment information. Such a system may provide analytics about where users are from, which payment methods they typically use, among others.

In some exemplary embodiments, a dynamic set of checks may uniquely identify a user across network identities. A network identity may be provided through the network signature. The network signature may be defined by the set of network attributes which may comprise the user's identity from the point of view of the merchant. For example, network attributes may include the IP addresses that the user has come from, the browser or computer information sampled in the application, and/or the cookie that indicates the same computer or browser has visited the Web site or merchant before.

In some exemplary embodiments, an authentication system may include a test to register the user to a new computer based on a required set of credentials. This may also bind the network signature to another computer and/or another network identity. In some exemplary embodiments, multiple payment methods may be accepted for the same network identity.

Figure 4:
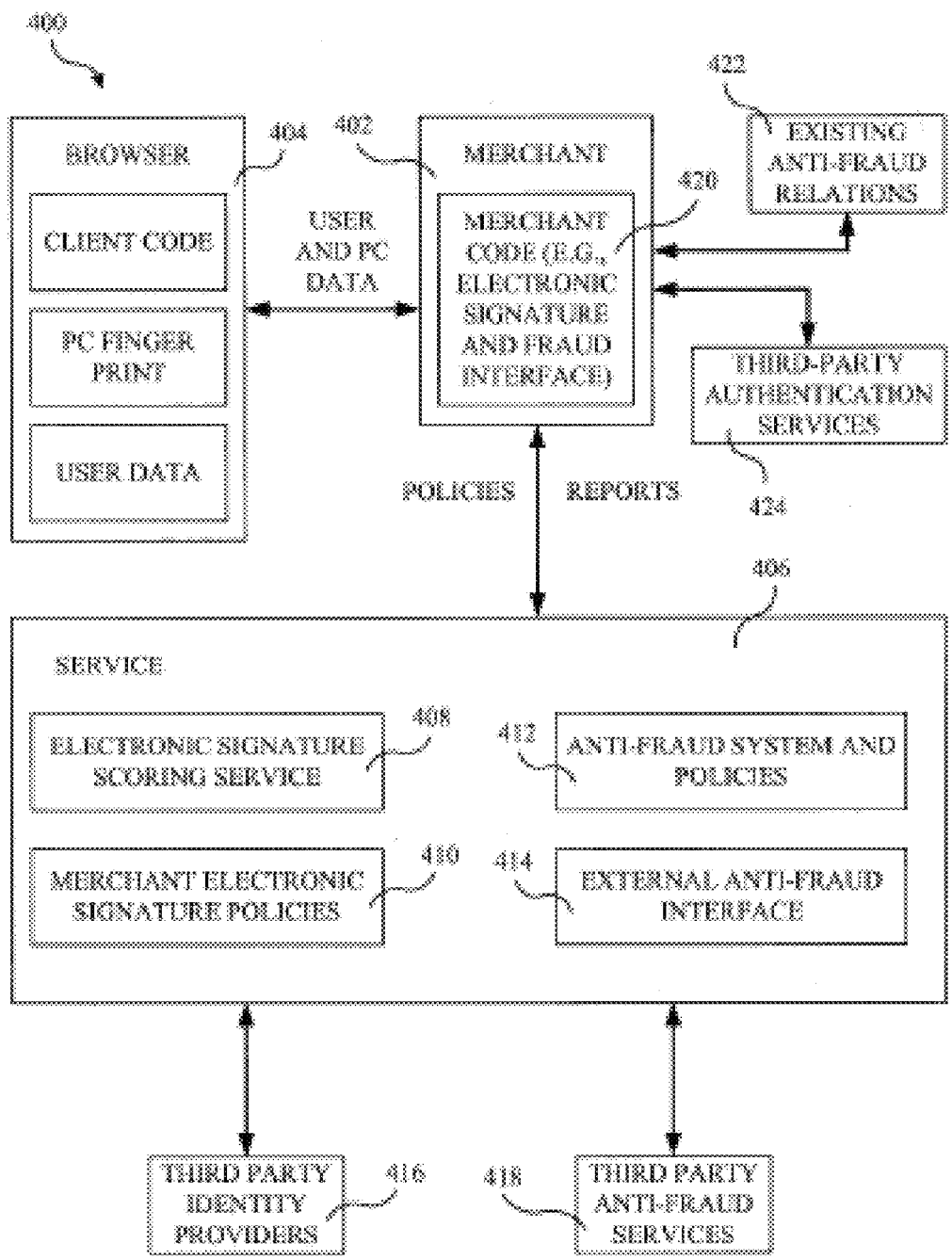
FIG. 4 is block diagram illustrating an exemplary system for assessing and authenticating a transaction.

FIG. 4 illustrates an exemplary system 400 for assessing and authenticating a transaction, which may include a merchant computer system 402, a user computer system 404, and/or server system(s) 406, which may implement transaction assessment and authentication methods described herein. Server system(s) 406 may include an electronic signature scoring service 408, merchant electronic signature policies 410, anti-fraud systems and policies 412, and/or an external anti-fraud interface 414. Server system(s) 406 may be operatively connected to third party identity providers 416 and/or third party anti-fraud services 418. Merchant computer system 402 may include merchant code 420 (e.g., an electronic signature and fraud interface) and/or may be operatively connected to existing anti-fraud relations 422 and/or third party authentication services 424.

In some exemplary embodiments, the merchant computer system 402, user computer system 404, and/or server system(s) 406 may be in communication with each other directly or via network connections (such as the Internet, an intranet or other network). The user information (including network information, for example) may be transmitted to the user information database(s) for storage.

In some exemplary embodiments, an electronic commerce payment instrument verification system and/or method may use unique attributes of computers e.g., such as is described in the cookie and network signature above) and/or prior purchasing behavior (e.g., such as the transaction list and transactions results that have been seen for the user) associated with a payment instrument to determine whether a person attempting to use the payment instrument is truly its owner. Some exemplary embodiments may include one or more servers configured to receive payment requests from merchant computer systems, where the servers and associated software may be configured to verify the identity of the payment instrument user prior to allowing the payment to be made to the merchant. For example, the servers may receive one or more pieces of information (which may be encrypted) from the user's computer to verify the location of the computer using the network address or other network characteristics. The servers may be configured to determine the degree to which the user's prior purchasing behavior correlates with the requested transaction. For example, the servers may compare the network address(es) used in the past to determine whether the there is a correlation between the current transaction and the previous transaction(s). Based at least in part upon correlation and/or matching information between the previously collected data and the newly collected data, a transaction may be authorized.

Some exemplary embodiments may include a transaction assessment and authentication system that relies upon an independent combination of an electronic signature and prior purchasing behavior to deny or allow use of a payment instrument in a transaction. For example, such a system may utilize one or more cookies on the user's computer in its assessment and authentication. Similarly, some exemplary methods may include evaluating a combination of an electronic signature (which may include one or more cookies) and prior purchasing behavior (e.g., such as the transactions attempts and the results returned by the payment processor or gateway) to deny or allow use of a payment instrument in a transaction.

To provide additional context for various aspects of the present invention, the following discussion is intended to provide a brief, general description of a suitable computing environment in which the various aspects of the invention may be implemented. While some exemplary embodiments of the invention relate to the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, as well as personal computers, hand-held wireless computing devices, microprocessor-based or programmable consumer electronics, and the like, each of which can be operatively coupled to one or more associated devices. Aspects of the invention may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects of the invention may include a computer that includes a processing unit, a system memory and a system bus. The system bus couples system components including, but not limited to, the system memory to the processing unit. The processing unit may be any of various commercially available processors. Dual microprocessors and other multi processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is also within the scope of the disclosure that a user may enter commands and information into the computer through one or more wired/wireless input devices, for example, a touch-screen, a keyboard and a pointing device, such as a mouse. Other input devices may include a microphone (functioning in association with appropriate language processing/recognition software as know to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Some exemplary embodiments of the invention may accumulate results from transactions over time, such as charge backs and refunds. This information may help in assessing the fraud score of a transaction requested by the user. For example, a lower fraud score would result from knowledge that this user does regular charge backs, then merchants can apply their anti-fraud policy to determine whether the transaction would be accepted.

Some exemplary embodiments may be configured to associate a credit card or another payment instrument with more than one user, as in a family situation. Building a graph connecting multiple users to the devices, locations, and payment instruments may also affect the fraud score of a transaction. A graph may associate different entities through having common key attributes that may uniquely identify a user. For example, if two users share the same browser or PC fingerprint, then the graph may identify those two users as associated by sharing the browser or fingerprint. The same may apply for IP address, credit card number or billing address, for example.

In some exemplary embodiments, use of a payment instrument through a known trusted source (e.g., certain well-known and trusted online retailers) may establish a base reputation for a user with an electronic signature for a merchant or collection of merchants not affiliated with the trusted source. For example, recognizing the user's use of the trusted source for a transaction may provide an increased level of confidence that the user is known to accurately to the service.

Figure 5:
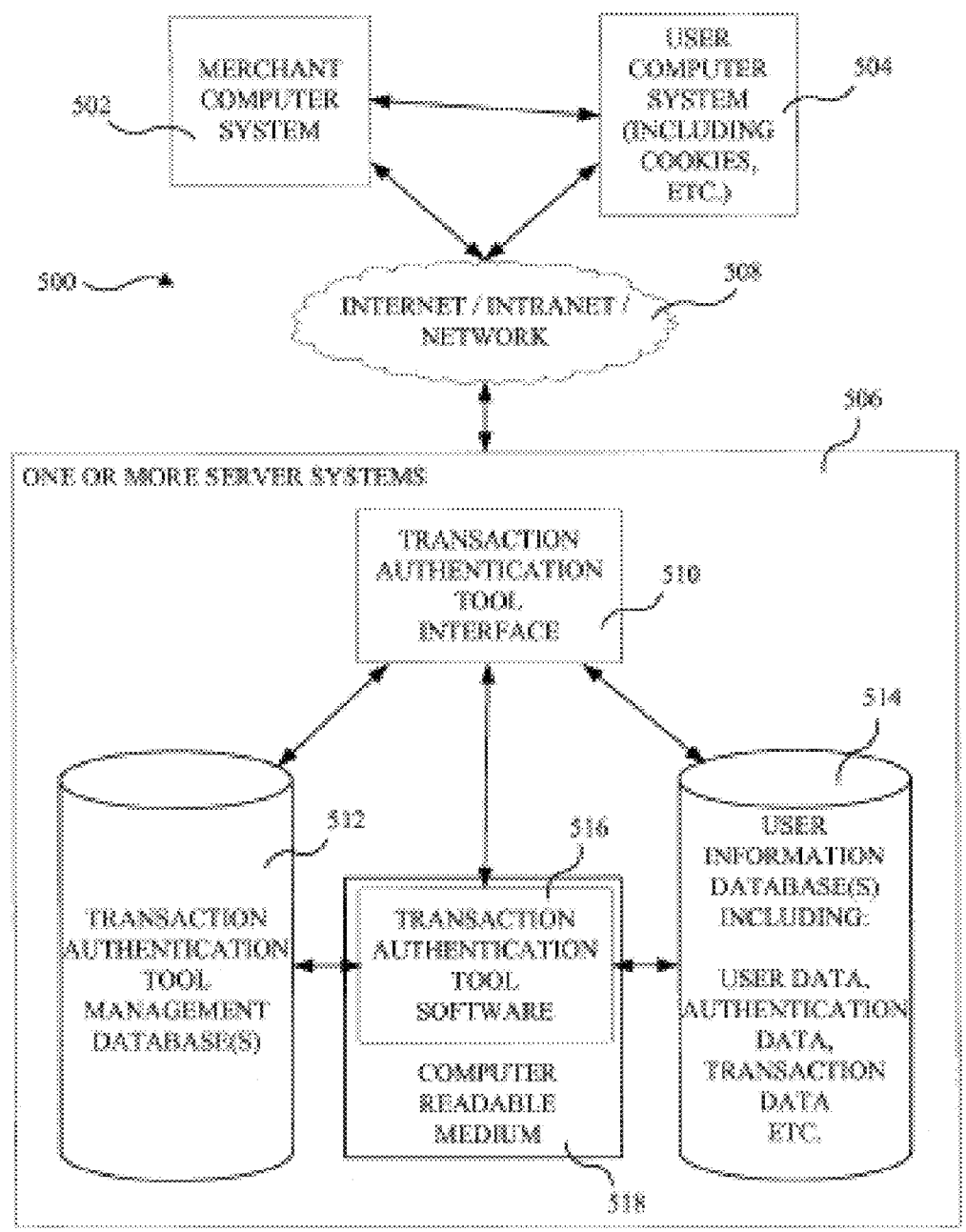
FIG. 5 is a block diagram illustrating an exemplary system for assessing and authenticating a transaction.

FIG. 5 is a block diagram illustrating an exemplary system 500 for assessing and authenticating transactions according to the present disclosure. One or more merchant computer systems 502, one or more user computer systems 504, and/or one or more server systems 506 may be operatively connected via one or more networks 508, such as the Internet, one or more intranets, etc. Server systems 506 may include a transaction authentication tool interface 510, which may be operatively connected to one or more transaction authentication tool management databases 512, one or more user information databases 514 (which may include user data, authentication data, transaction data, etc.), and/or transaction authentication tool software 516 (which may be provided on one or more computer-readable media 518).

Figure 6:
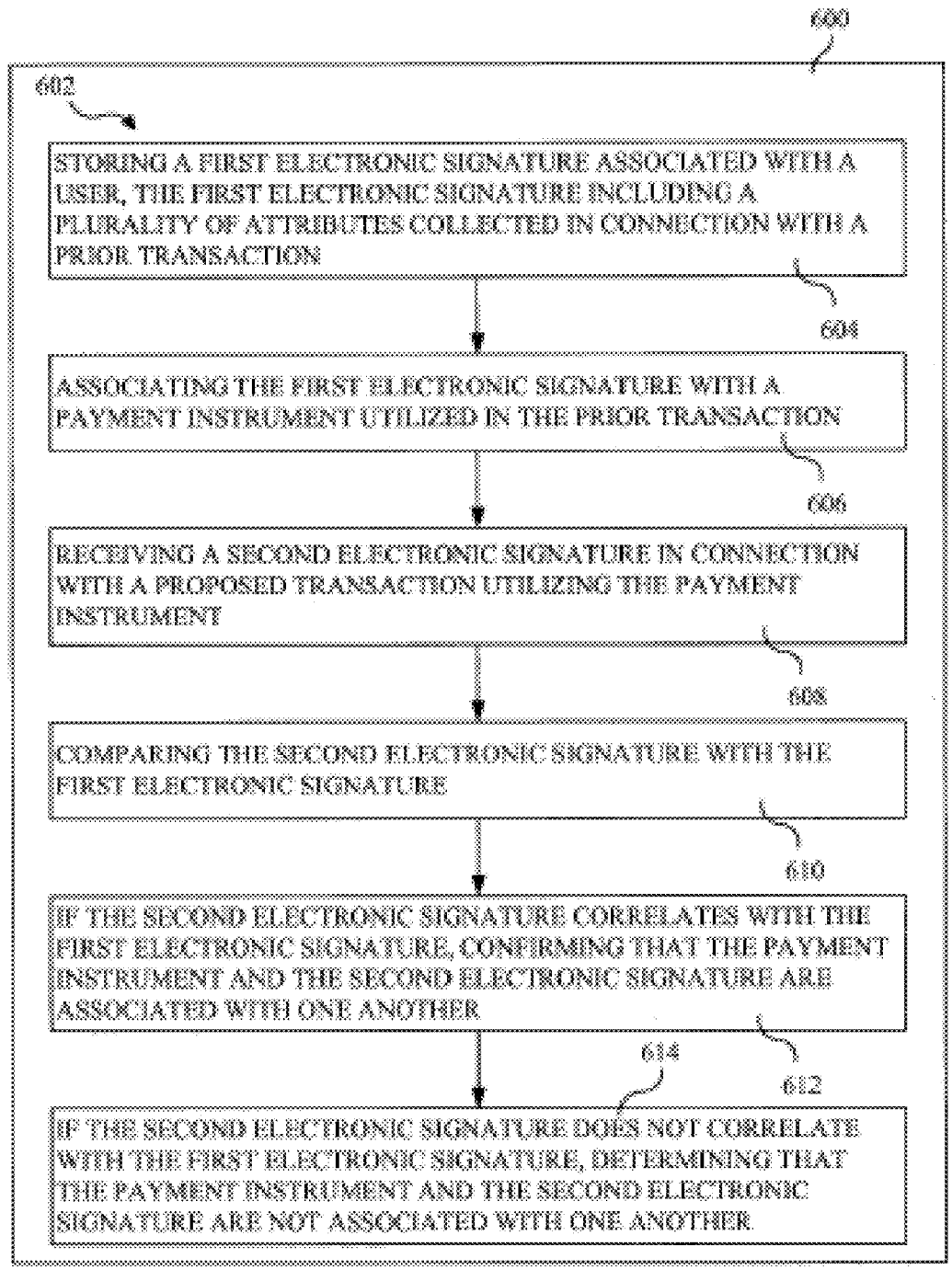
FIG. 6 is a block diagram illustrating an exemplary computer-readable medium.

FIG. 6 is a block diagram illustrating an exemplary computer-readable medium 600 including computer-executable instructions stored thereon, which, when executed by a computer, enable the computer to perform a method 602 including the following operations. Operation 604 may include storing a first electronic signature associated with a user, the first electronic signature including a plurality of attributes collected in connection with a prior transaction. Operation 606 may include associating the first electronic signature with a payment instrument utilized in the prior transaction. Operation 608 may include receiving a second electronic signature in connection with a proposed transaction utilizing the payment instrument. Operation 610 may include comparing the second electronic signature with the first electronic signature. Operation 612 may include, if the second electronic signature correlates with the first electronic signature, confirming that the payment instrument and the second electronic signature are associated with one another. Operation 614 may include, if the second electronic signature does not correlate with the first electronic signature, determining that the payment instrument and the second electronic signature are not associated with one another.

Figure 7:
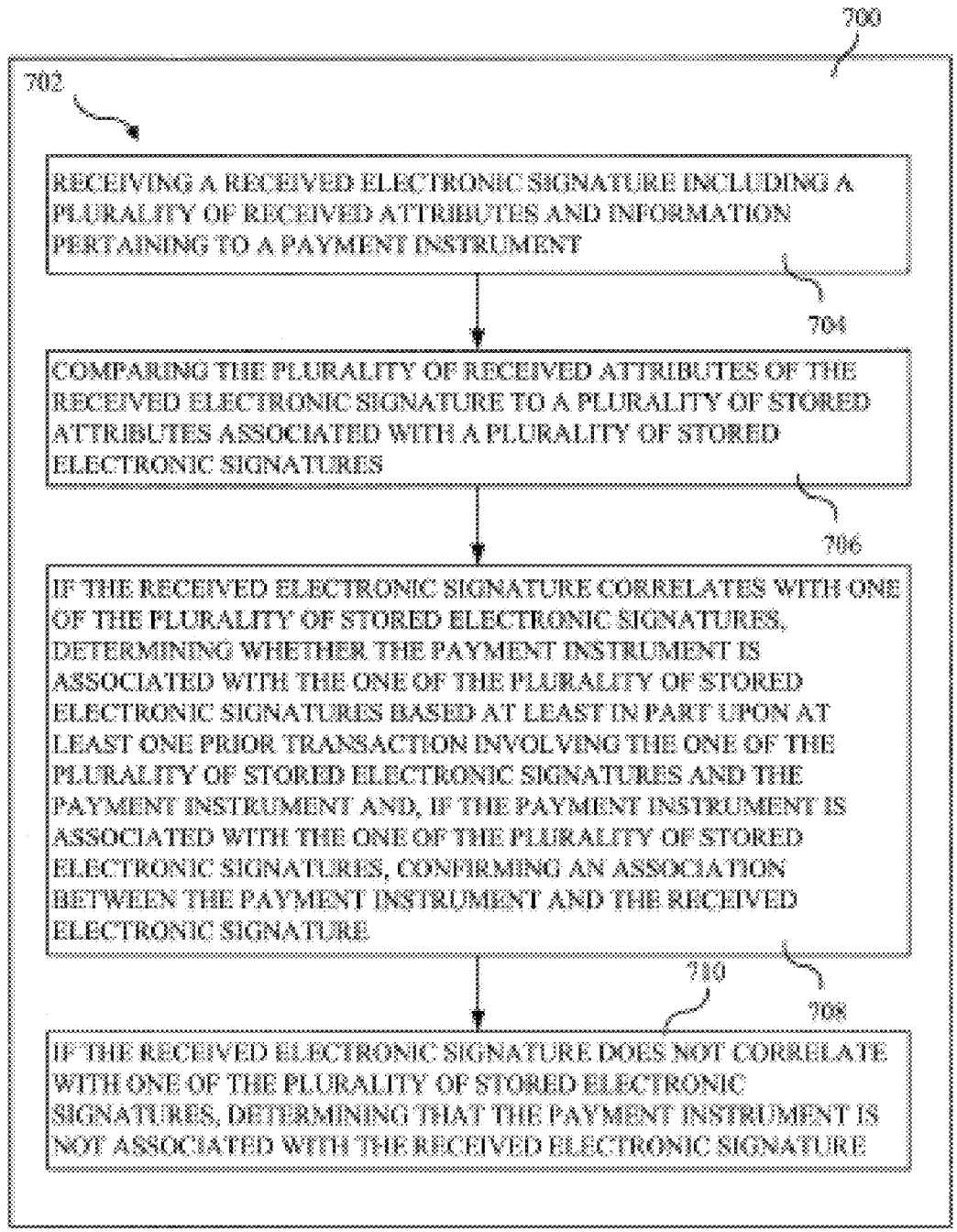
FIG. 7 is a block diagram illustrating an exemplary computer-readable medium.

FIG. 7 is a block diagram illustrating an exemplary computer-readable medium 700 including computer-executable instructions stored thereon, which, when executed by a computer, enable the computer to perform a method 702 including the following operations. Operation 704 may include receiving a received electronic signature including a plurality of received attributes and information pertaining to a payment instrument. Operation 706 may include comparing the plurality of received attributes of the received electronic signature to a plurality of stored attributes associated with a plurality of stored electronic signatures. Operation 708 may include, if the received electronic signature correlates with one of the plurality of stored electronic signatures, determining whether the payment instrument is associated with the one of the plurality of stored electronic signatures based at least in part upon at least one prior transaction involving the one of the plurality of stored electronic signatures and the payment instrument and, if the payment instrument is associated with the one of the plurality of stored electronic signatures, confirming an association between the payment instrument and the received electronic signature. Operation 710 may include, if the received electronic signature does not correlate with one of the plurality of stored electronic signatures, determining that the payment instrument is not associated with the received electronic signature.

Figure 8:
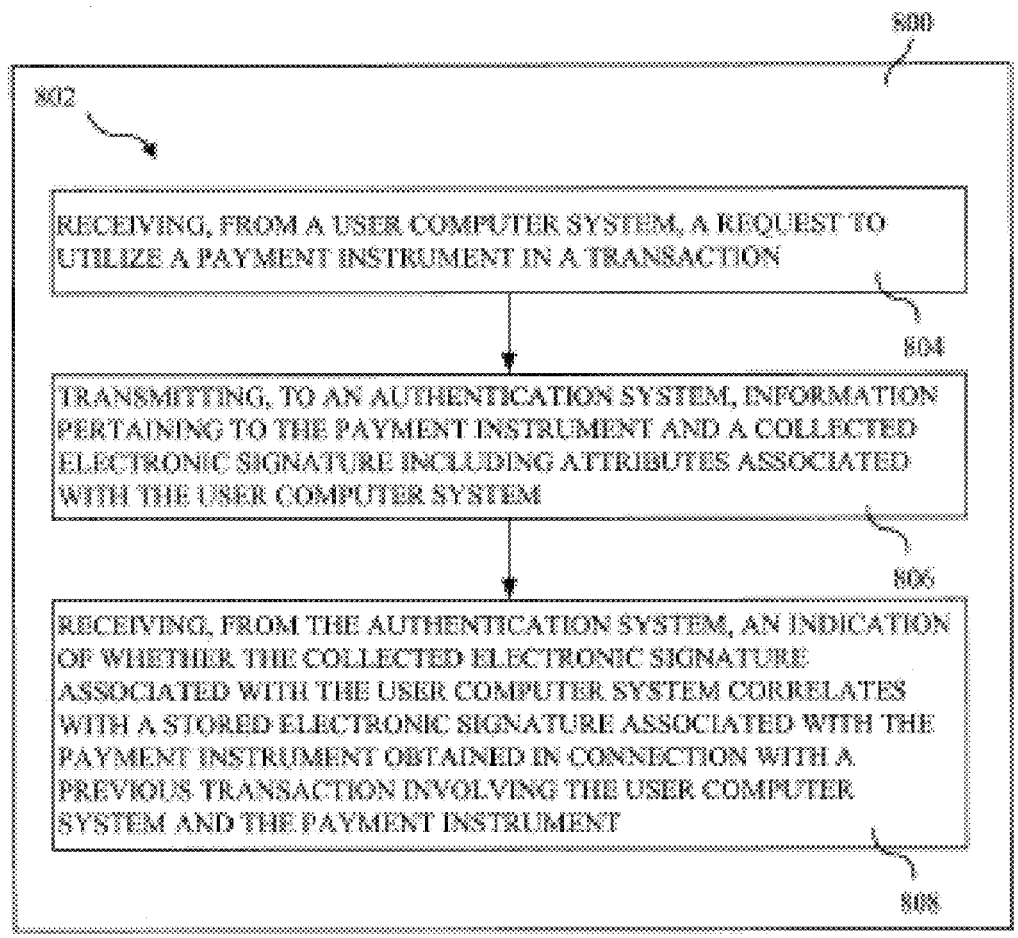
FIG. 8 is a block diagram illustrating an exemplary computer-readable medium; all in accordance with at least some aspects of the present disclosure.
Figure 9:
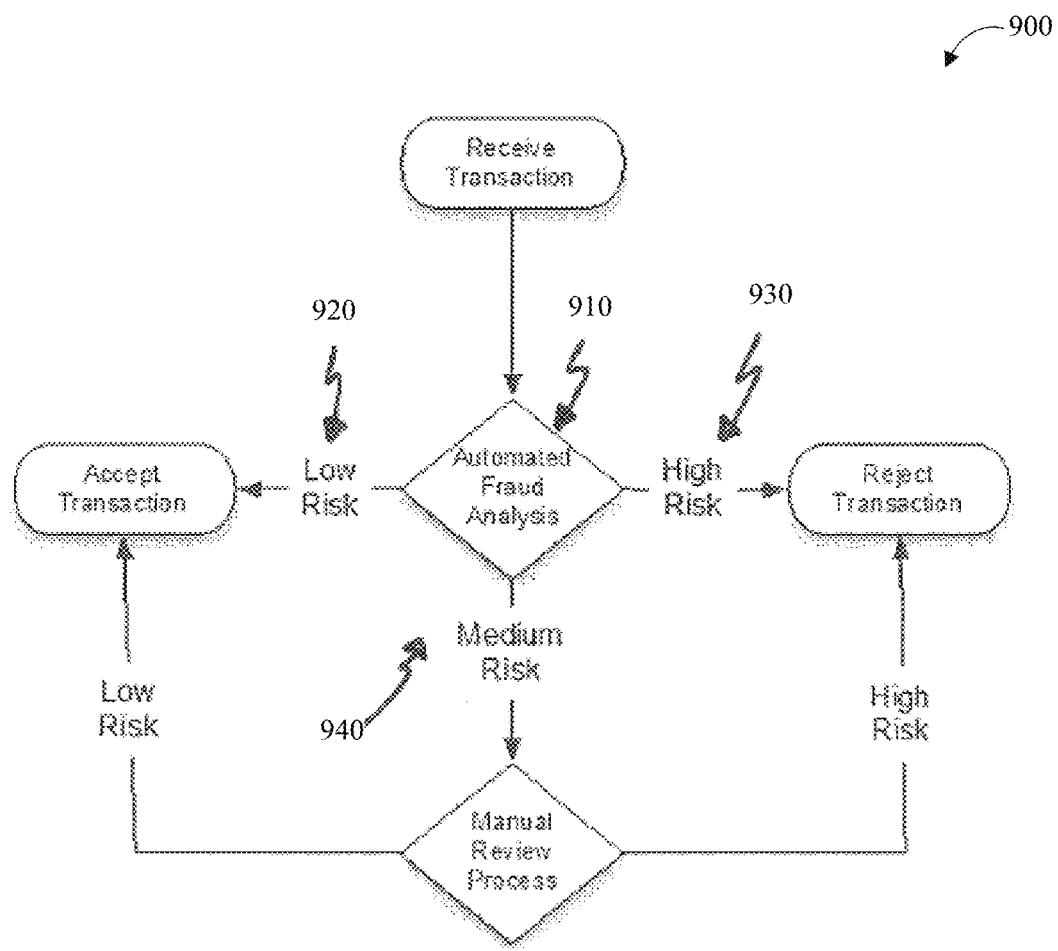
FIG. 9 is a block diagram illustrating an exemplary payment transaction anti-fraud system such as is currently in use.

FIG. 8 is a block diagram illustrating an exemplary computer-readable medium 800 including computer-executable instructions stored thereon, which, when executed by a computer, enable the computer to perform a method 802 including the following operations. Operation 804 may include receiving, from a user computer system, a request to utilize a payment instrument in a transaction. Operation 806 may include transmitting, to an authentication system, information pertaining to the payment instrument and a collected electronic signature including attributes associated with the user computer system. Operation 808 may include receiving, from the authentication system, an indication of whether the collected electronic signature associated with the user computer system correlates with a stored electronic signature associated with the payment instrument obtained in connection with a previous transaction involving the user computer system and the payment instrument.

Figure 10:
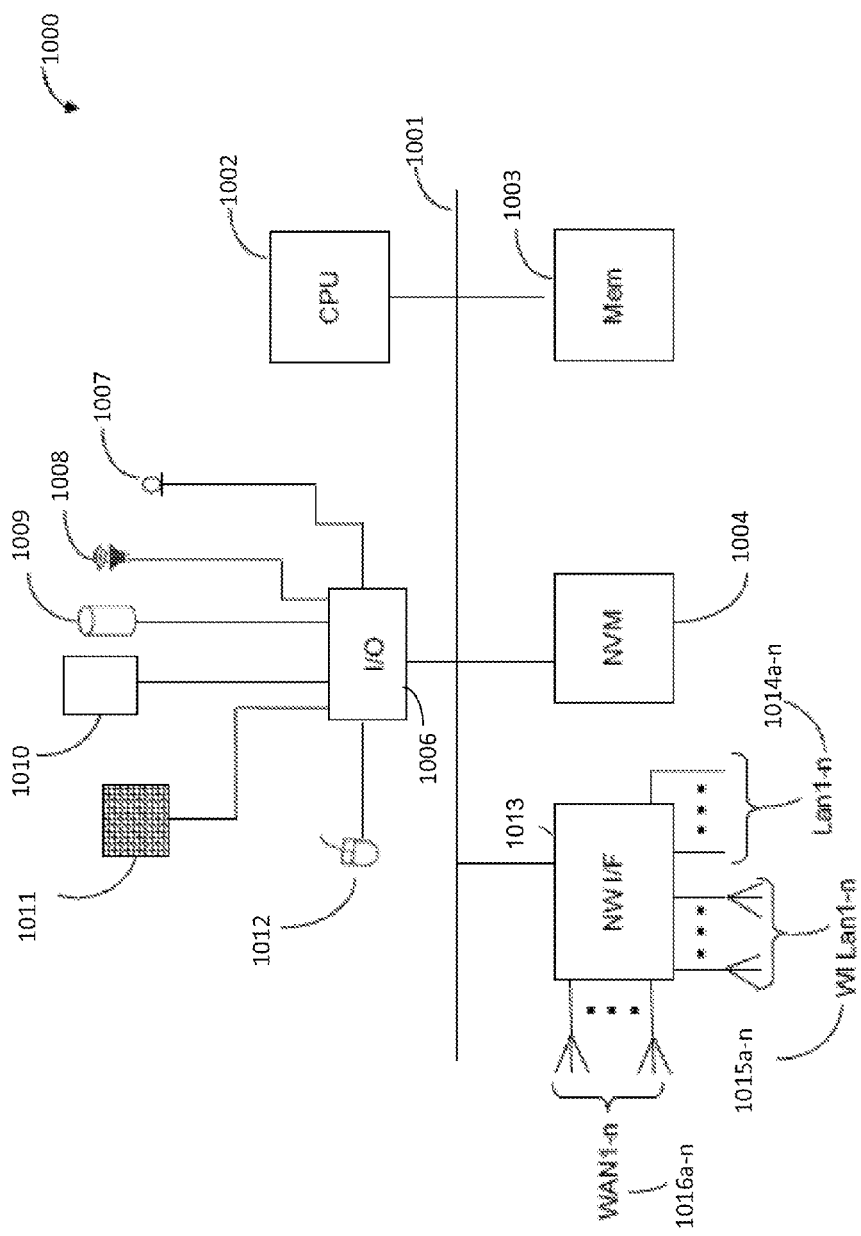
FIG. 10 is a block diagram illustrating an exemplary computing device associated with certain embodiments of the current disclosure.

FIG. 10 shows an overview of an exemplary computing device 1000. Components comprising device 1000 include a bus 1001, CPU 1002; memory 1003; nonvolatile memory (NVM) 1004 for holding programs and start-up code, etc.; an I/O section 1006; a mass storage device 1009 that can hold additional codes such as operating systems, applications, data, etc.; and a network interface 1013, which may accommodate any of three groups of interface types 1014a-n, 1015a-n, and 1016a-n. Wired LAN types 1-n 1014a-n may be any of various types, including, but not limited to, Ethernet, serial port, FireWire, Thunderbolt, etc. Wireless LAN types 1-n 1015a-n may be any of various types, including, but not limited to, Wi-Fi, Bluetooth, Zigbee, ultra wideband, etc. WAN types 1-n 1016a-n may be any of various types, including, but not limited to, cellular network interfaces of various different types using various different bands. Device 1000 may have a display 1010. Data input may be accomplished via a input means 1011, which may be a touch screen, a physical keyboard, or both. Pointing device 1012 could be a mouse, a touch pad, a touch screen, a joy stick, or any combinations thereof, all connected to the I/O. Other I/O devices may include a speaker 1008, a microphone 1007, a camera (not shown), etc. Computing device 1000 may be any of a wide variety of types, including, for example, a smart phone, a computer pad, a laptop, a desktop, a work station, server, etc.

Figure 11:
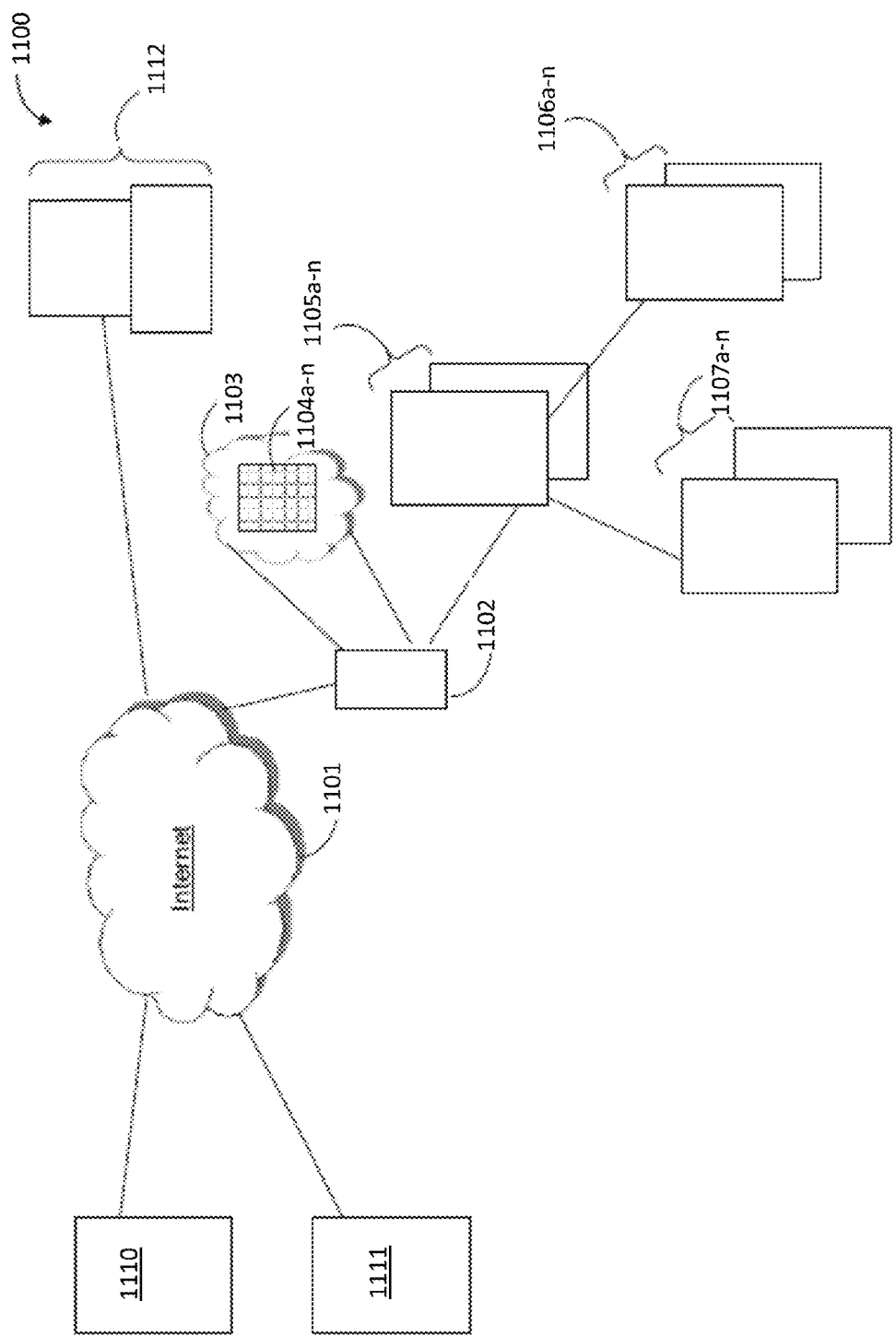
FIG. 11 is a block diagram illustrating an exemplary cloud computing infrastructure associated with certain embodiments of the current disclosure.

FIG. 11 shows an exemplary overview of a standard cloud computing infrastructure 1100. Server 1102 may be a single physical server or it may be a cluster 1103 of many smaller servers 1104a-n. These servers can contain multiple sets of codes 1105a-n, including multiple operating systems, on top of which may be multiple applications 1106a-n and additional multiple data sets for storage 1107a-n. Client computing devices 1110 and 1111, as well as desktop device 1112, connect to server 1102 via Internet 1101. Functionally a desktop computer is very similar to a smart phone, except that the relationship between performance and display and operating system, etc. is different, and a desktop computer has typically a much larger display. Also, in server 1102, whether a single server or a cluster, each node is just a specialized version of generic computing device 1000. Cloud computer arrangement 1100 enables applications to cooperate between one or more of the client devices and the cloud, where some functionality is performed in the cloud and some is on the device. Further, it may not always be clear what operations are being done where, and operation locations vary from situation to situation, as well as varying according the capabilities of the computing device used.

The current disclosure provides a mechanism to reduce the prevalence of false positives in the set of transactions that are flagged for a manual review process while still providing the benefits of a general policy based analysis.

Typically, policy-based systems are by definition always correct, as they are just following the policy. For anti-fraud and general risk analysis, the policies can cause too many manual review transactions that are likely low risk. One way to reduce the manual review transactions is by making the policies more specific, for example, adding exclusions to the policy definitions, but this approach is proven to make the system much more complex to operate and to configure, and effectively slower, reducing the chances to make the evaluation of risk in real-time.

The current disclosure enables the system to remain simple to configure and perform in real-time, while reducing the overall manual review process.

In addition, when policies become too specific to a particular threat model, the system tends to miss variations of these scenarios or new scenarios altogether, increasing the chances of false negatives.

Figure 12:
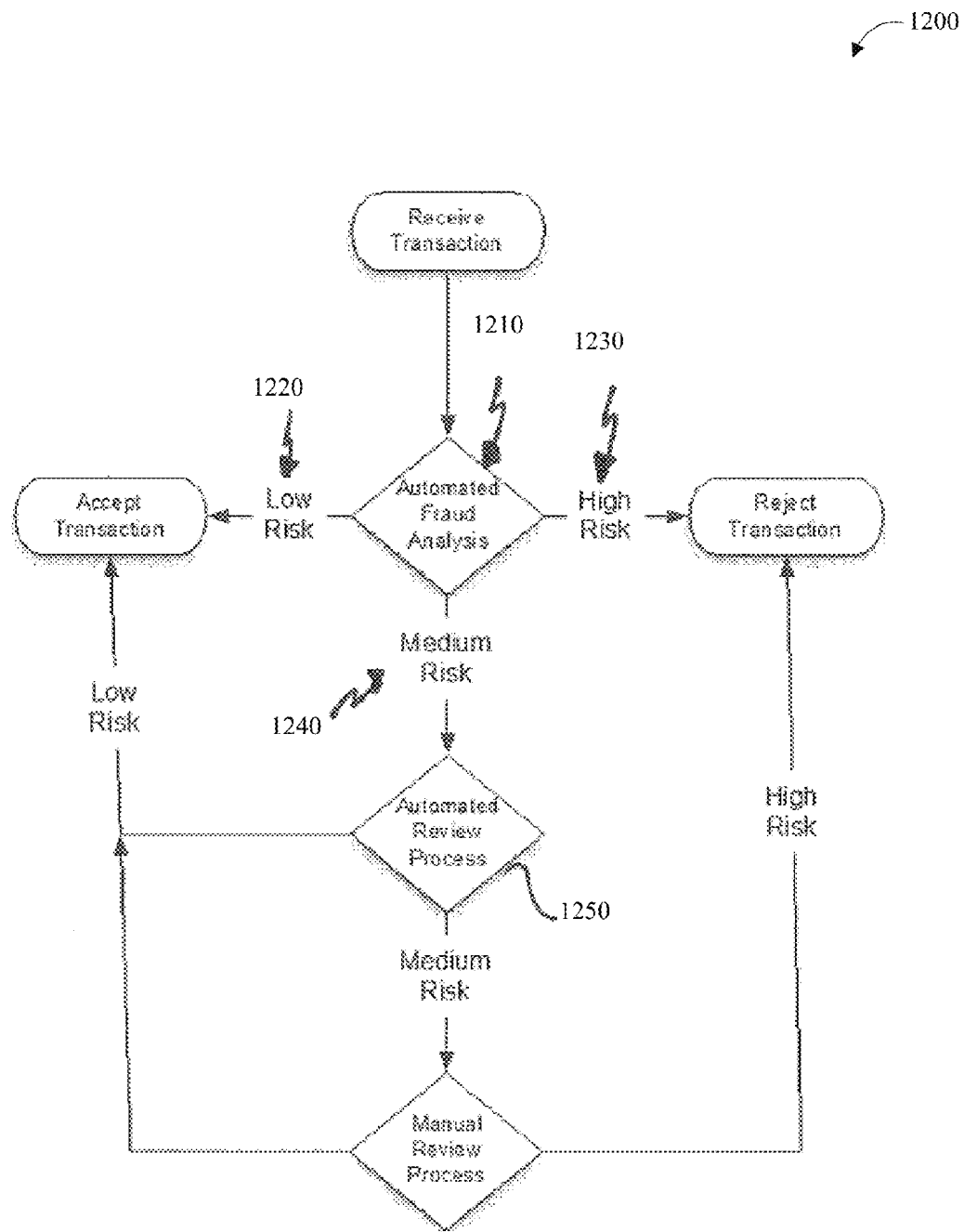
FIG. 12 is a block diagram illustrating an exemplary system embodiment.

Because of this problem, embodiments of the current disclosure are focusing on replicating models where it is proven that the transactions should be accepted, leaving the "unknown" scenarios still for manual review. Whereas a conventional anti-fraud system is focused on finding fraud, that is, reasons to reject a transaction; an exemplary embodiment of the system 1200 described herein, as shown in FIG. 12, adds an automated evaluation pass 1250 of the results of the anti-fraud system with the goal of finding reasons to accept transactions that have been flagged for review.

Furthermore in e-commerce transactions the amount of data available for verifying the identity of the consumer is not sufficient. Third party databases usually require information like social security numbers, date of birth to increase the accuracy of data match. So the absence of a match in these databases it is usually not a good indicator of fraud. Instead a positive match is useful in lowering risk when it happens. Applying identity verification to all ecommerce transactions would be then cost prohibitive and impractical to online merchants, instead through embodiments of the current disclosure, fraud analysts can cost-effectively use these third party databases focusing on the positive matches.

Without loss of generality, the transactions might be a payment transaction, an account registration, an account login or a transfer between accounts or any other type of account-related transaction.

Figure 13:
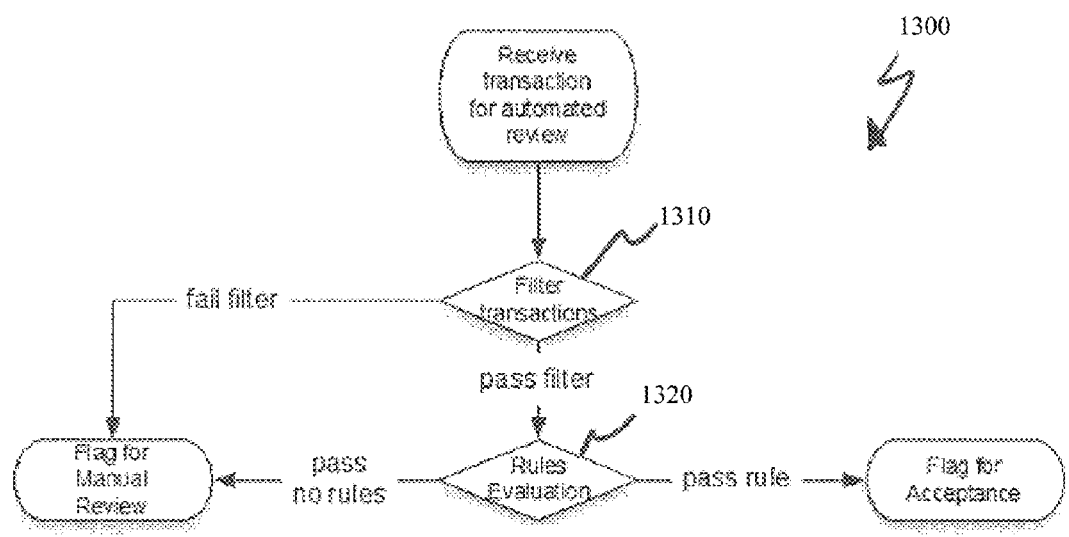
FIG. 13 is a block diagram illustrating an exemplary automated review process.

As shown in FIG. 13, an embodiment of the automated review process 1300 (for transactions initially flagged for manual review) could include multiple steps, for example:

Firstly, filter transaction based on for example transaction value, or the type of goods (virtual versus physical) being transacted (step 1310). Further, in some cases, a filter may be applied on the reputation score. As a result, for example, a client might not run the review policy on suspicious users, just unknown, recognized and trusted.

Secondly, evaluate rules with the goal of finding transaction characteristics that lead to the acceptance of the transaction (step 1320).

Examples of such rules that might lead to the acceptance of a transaction that has previously been flagged for review could be these:

Accept transactions under review that are using prepaid cards and the bank has authorized the transaction.

Accept transactions under review where there is a history of the card being used with the consumer account, and there is no history of chargebacks or refunds.

Accept transactions under review where the address associated with the consumer's phone number matches the billing address associated with the payment and the consumer responds affirmatively to an automated phone call.

Accept transactions under review where the shipping address matches the address associated with the consumer's phone number.

Accept transactions under review if there is a positive, non fraud, match between the physical contact information provided in the transaction and a third-party service.

Accept transactions under review if there is a positive, non fraud, match between the email contact information provided and the physical contact information for the transaction in a third-party service.

Figure 14:
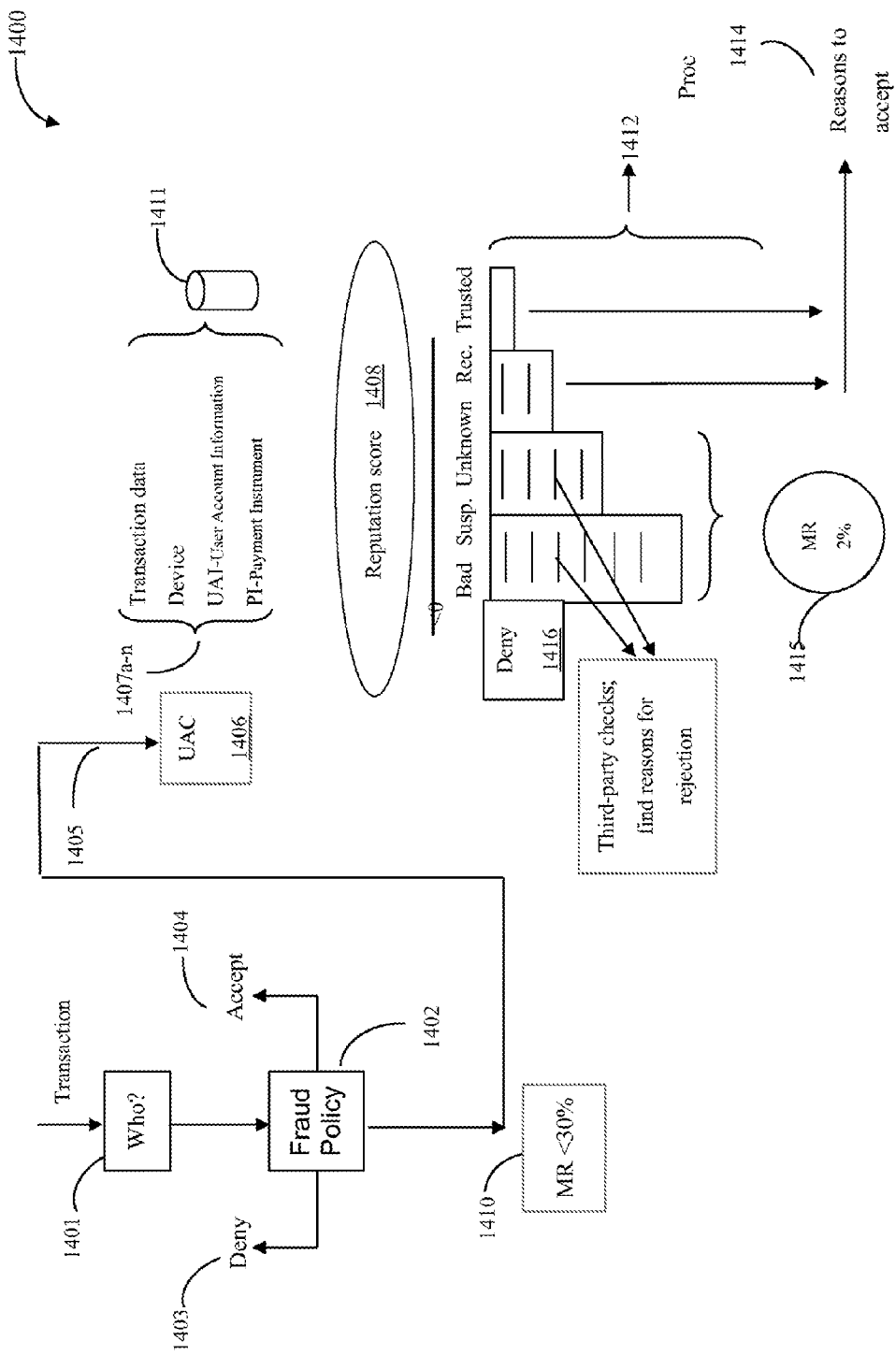
FIG. 14 is a block diagram illustrating an exemplary automated review process.

FIG. 14 shows an exemplary automated review process 1400, according to one aspect of the system and method disclosed herein. In step 1401, the system attempts to identify the person ("Who?") trying to complete a transaction. Then in step 1402 the system applies the primary fraud policy, which can result in an outright denial 1403 or in an outright acceptance 1404. The remaining cases, typically as high as 30 percent, would, in current usage, go to manual review MR 1410. However, in process 1400, instead of sending cases to manual review 1410, at this stage typically as high as 30 percent of all cases, the system sends cases to secondary review 1405, in which the user authentication context (UAC) 1406 adds a review for additional data 1407a-n, such as Devices used to make the transaction(s), including but not limited to devices such as notebook computers, desk top computers, tablets, smartphones, etc.; user account information UAI; payment instrument PI; shipping address SA; etc., comparing each with existing data or linkage of the data to other accounts in data repository 1411. After this review, the system reassesses a case, assigning it a reputation score 1408 from below 0 to over 100 and placing it in one of several groups, or process buckets, 1412, such as Bad, Suspicious (Susp.), Unknown, Recognized (Rec.), and Trusted. Cases with a score below 0 get an immediate denial 1416. If a case falls into a Suspicious, Unknown, or Recognized group, but is not fully trusted, the system then typically performs exhaustive testing against its own data set and heuristics and then checks with third parties, seeking reasons to reject the case. Such reasons can include minor inconsistencies, such as incorrect phone number, etc., leading after inspection with third-party providers in many cases to an immediate rejection 1413, but in some to manual review (not shown). The system examines recognized cases (with third-party providers in some cases) for additional reasons 1414 to trust them. Those cases still unresolved are then sent to manual resolution 1415, which at this point is typically only about 2 percent of the cases. Thus the system and method disclosed herein reduces manual reviews from typically as high as 30 percent to around 2 percent. Some of the steps described in this section may be ordered or grouped differently, without changing the overall checks performed or the outcome obtained.

Figure 15:
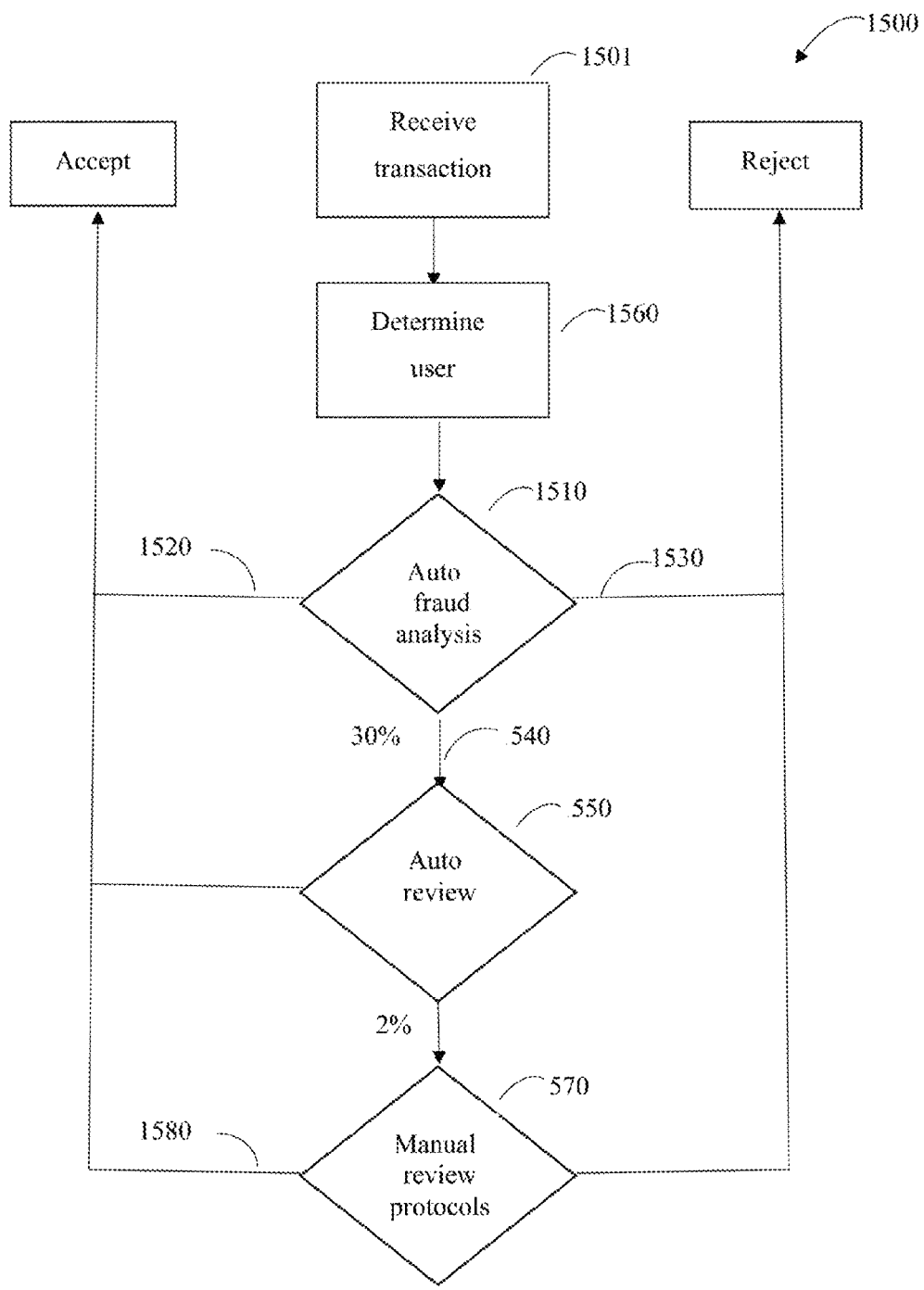
FIG. 15 is a block diagram illustrating an exemplary automated review process.
Figure 16:
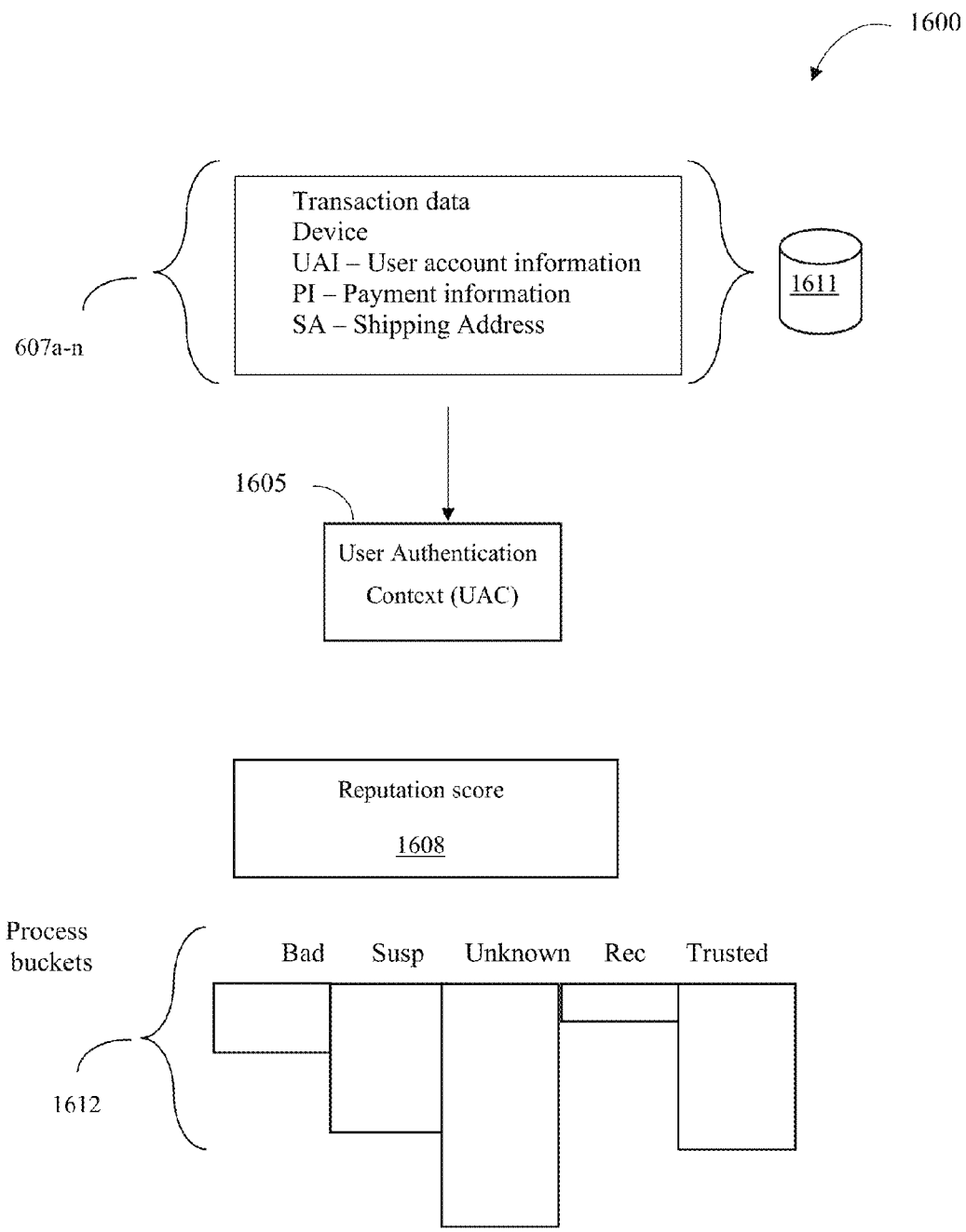
FIG. 16 is a block diagram illustrating an exemplary automated review process.

FIG. 15 and FIG. 16 show an exemplary automated review processes 1500 and 1600, according to one aspect of the system and method disclosed herein. As they are closely inter related, so is their discussion herein. In process 1500, after receiving a transaction at 1501, at step 1560 the system attempts to identify the person trying to complete a transaction. For this purpose, process 1600 from FIG. 16 is invoked to perform a user authentication context (UAC), which is derived from the provided transaction data 1607a-n, as described in the discussion of FIG. 14 above and throughout this document, that includes things such as devices used to make the transaction(s), including but not limited to devices such as notebook computers, desk top computers, tablets, smartphones, etc.; user account information UAI; payment instrument PI; shipping address SA; etc. comparing each with existing data or linkage of the data to other accounts in data repository 1611. After this review, the system assesses the UAC, assigning it a reputation score 1608 from below 0 to 100 and placing it in one of several groups, or process buckets, 1612, such as Bad, Suspicious (Susp.), Unknown, Recognized (Rec.), and Trusted. Then returning to process 1500 at step 1510 the system applies the primary fraud policy, which can result in an outright denial 1530 or in an outright acceptance 1520. Cases with a score below 0 get an immediate denial 1530. Cases with a score of 100 (Trusted) get an immediate accept 1520. If a case falls into a Suspicious, Unknown, or Recognized group, but is not fully trusted, the system then typically performs exhaustive testing against its own data set and heuristics and then checks with third parties, seeking reasons to reject the case. Such reasons can include minor inconsistencies, such as incorrect phone number, etc., leading after inspection with third-party providers in many cases to an immediate rejection 1530, immediate acceptance 1520, but in some cases, typically as high as 30 percent, would, in current usage, go to manual review (1540). However, in process 1500, instead of sending cases to human review 1570, at this stage typically as high as 30 percent of all cases, the system sends cases to secondary review 1550. The system examines these cases (with third-party providers in some cases) for additional reasons to trust them 1580. Those cases still unresolved are then sent to human review 1570, which at this point is typically only about 2 percent of the cases. Thus the system and method disclosed herein reduces cases requiring human reviews from typically as high as 30 percent to around 2 percent.

Figure 17:
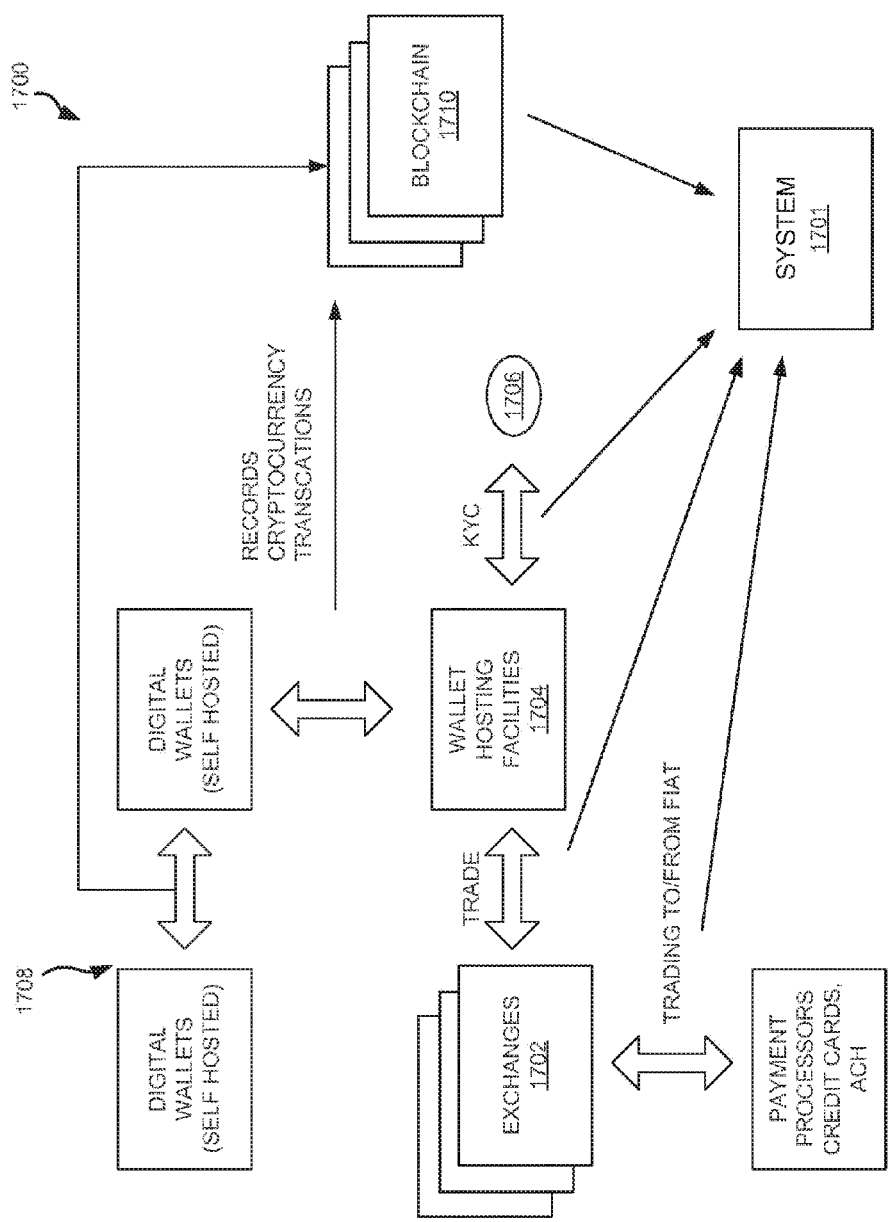
FIG. 17 is a block diagram illustrating an exemplary cryptocurrency exchange system according to the current disclosure.

FIG. 17 illustrates an exemplary cryptocurrency exchange system incorporating a system 1700 according to the current disclosure. The system includes cryptocurrency exchanges 1702 and wallet hosting facilities 1704 for exchanging cryptocurrency into another form of currency such as FIAT currency. The system also comprises a "know your customer" facility KYC 1706 for capturing information about the users and or respectively in some cases their digital wallets 1708 of the exchange system. As shown in FIG. 17, an exemplary system 1701 models transactions associated with cryptocurrency activities relevant to monitoring for suspicious money laundering activities (or other forms of illegal or fraudulent activities). In an embodiment, these transactions are monitored by contracting with some of the actors involved in these activities, and by monitoring and analyzing the public ledger—Blockchain 1710. The system does not require full visibility across all activities, but the more information the more accurate it becomes.

The contracted actors would submit the transactions to the system through an API that enforces a model used to later correlate data across all attributes.

In addition, the information that is part of the transactions, and the information that results from aggregating and correlating this data, is used to inform analysis on the blockchain 1710 to uncover additional correlations that aren't available to the system because of the lack of visibility, for example, based on monitoring of metadata from transactions (txn) and related Blockchain data, and or clustering or correlation based on PI metadata (Bitcoin or wallet) such as addresses and electronic DNA correlation This correlation describes basically the users that are either the sources or destinations (or both) of the money. The description of this (these) user(s) is then much richer than what the individual entities in the ecosystem may have.

A more thorough description of the user then allows for aggregations and heuristics that would not be possible otherwise.

When the heuristics and alerts flag suspicious activities the system issues a notification message to the AML investigators.

Figure 18:
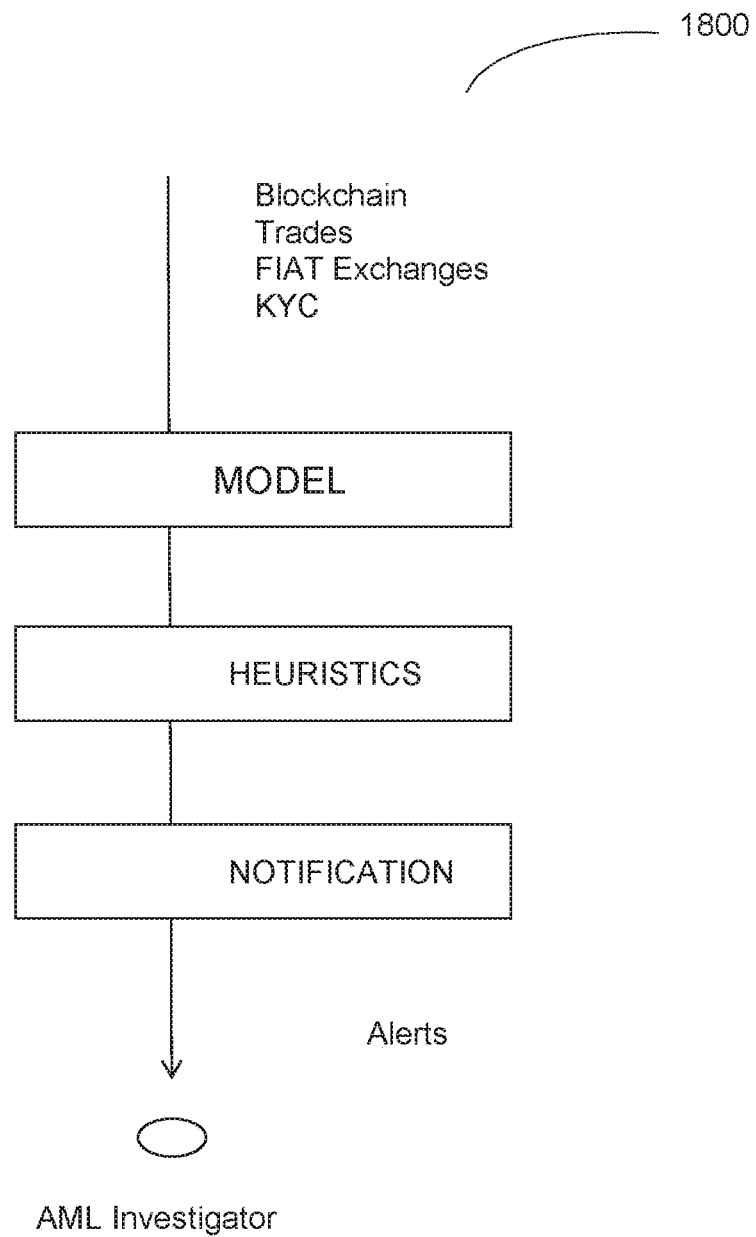
FIG. 18 is a block diagram illustrating an exemplary API model associated with an embodiment of the current disclosure.
Figure 19:
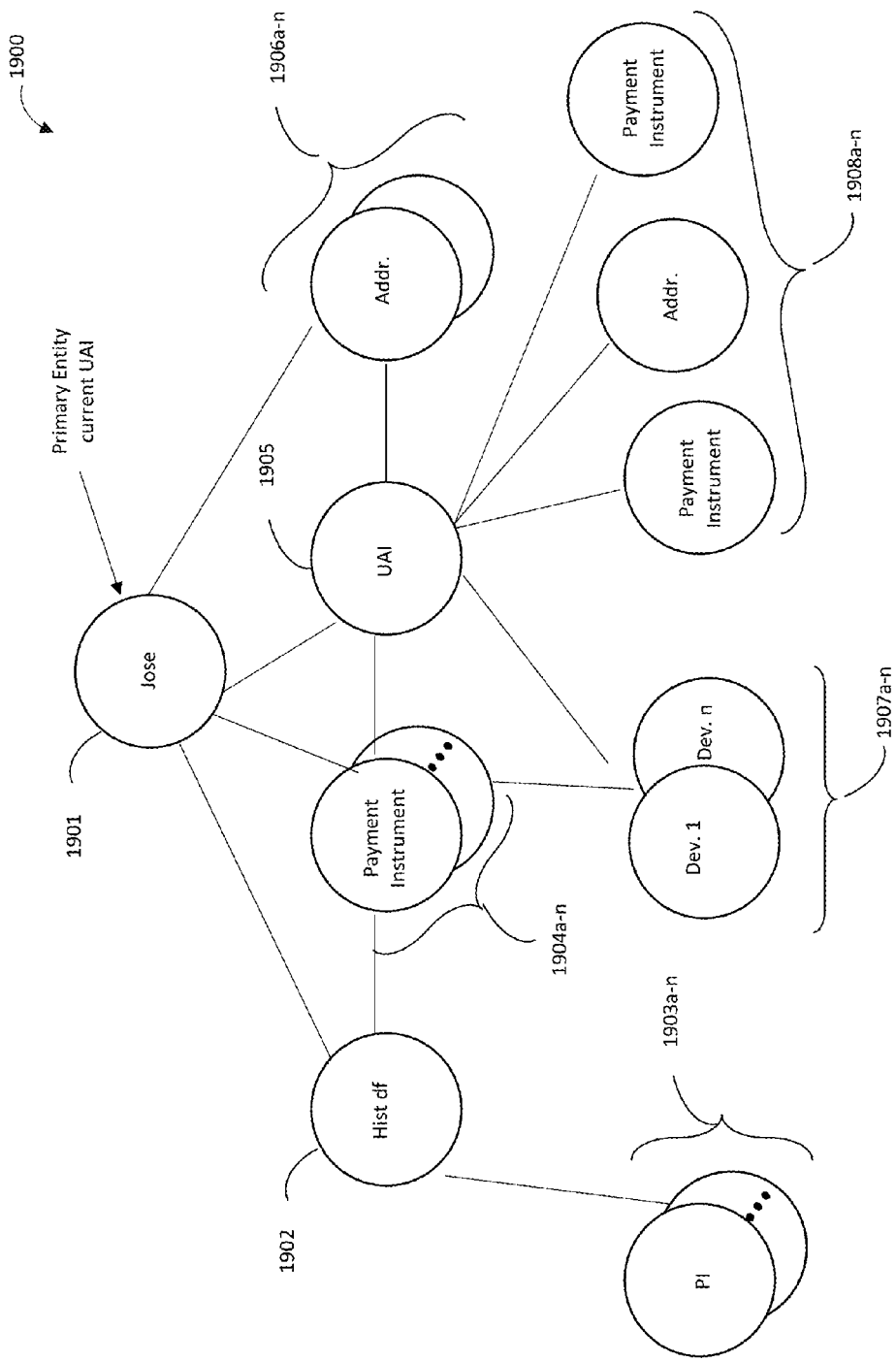
FIG. 19 is a block diagram illustrating exemplary data relationships with respect to a person/entity conducting a transaction in a data table according to the current disclosure.

Referring to FIG. 18, example API models include:
Transfer In (FIAT to crypto)
Transfer Out (crypto to FIAT)
Transfers (crypto to crypto)
KYC
Monitoring the Blockchain Referring to FIGS. 19 and 20, clustering is monitored for the following:
Monitoring of metadata from transactions (txn) and related Blockchain data
PI metadata (Bitcoin or wallet) such as addresses electronic DNA correlation FIG. 19 shows an exemplary diagram of data relationships 1900, according to one aspect of the system and method disclosed herein. The relationships are based on primary entity or person 1901, in this example, "Jose," about whom the system pulls a lot of related information, including, for example, history of previous payments 1902, history of all payment instruments 1903*a-n* ever used by this person or entity, current payment instrument 1904 and transactions related to that instrument, related devices 1907, related user account information (UAI) 1905, addresses ever used in conjunction with this entity 1906*a-n*, and any kind of additional information 1908*a-n* that may be somehow related to this user account. Although not necessarily related to entity 1901 or the current transaction, additional information may include, for example, additional payment instruments, addresses, etc. The system, by looking to see if any of this data may have any connection to a known bad or suspicious actor, may now link the current transaction or entity to said suspicious person, and thus by inference the current transaction or entity may be cast in a bad light as well.

Figure 20:
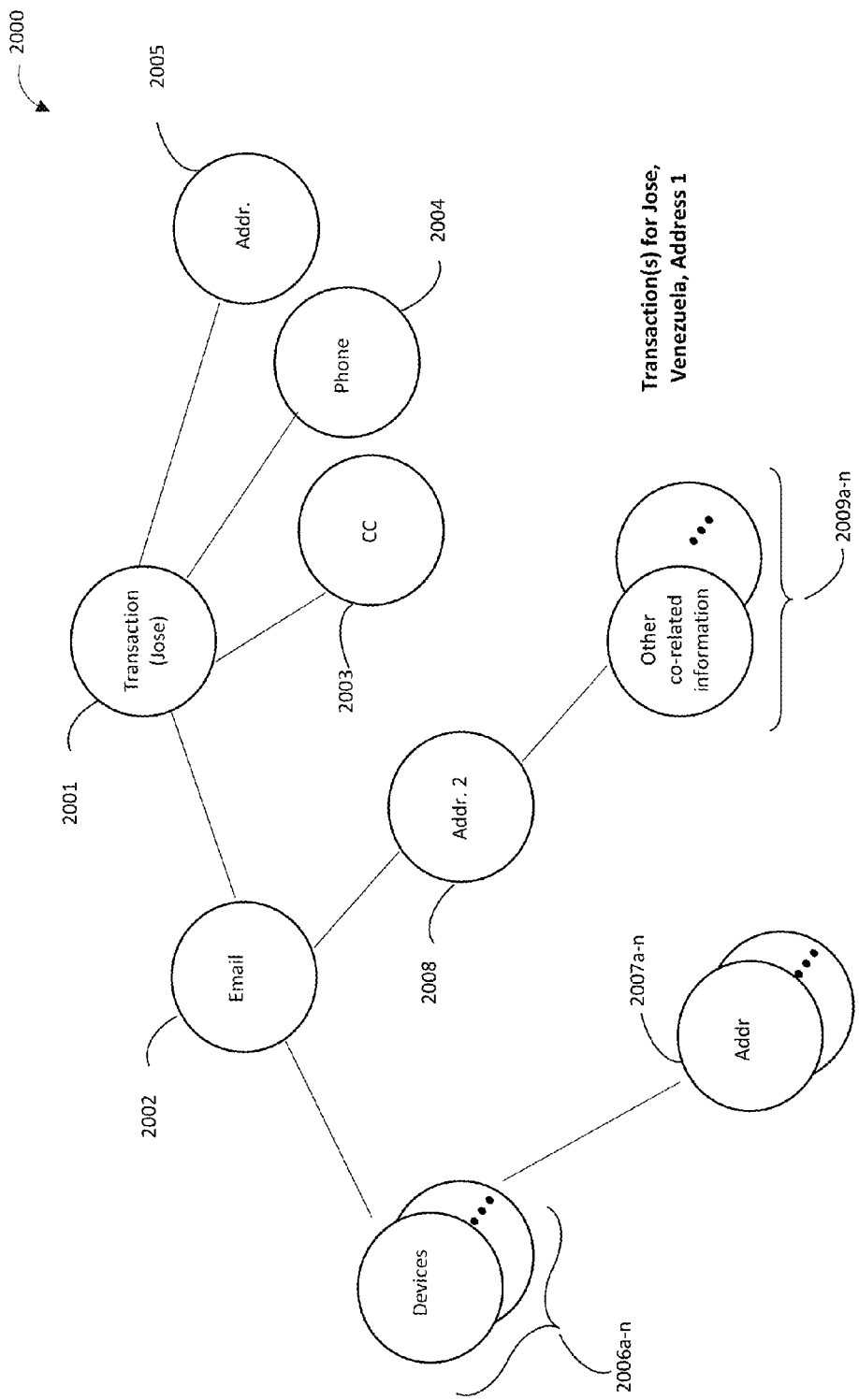
FIG. 20 is a block diagram illustrating exemplary data relationships with respect to a particular transaction in a data table according to the current disclosure.

FIG. 20 shows an exemplary diagram of data relationships 2000 for a transaction itself, according to one aspect of the system and method disclosed herein. Current transaction 2001 is enacted using email 2002 and all devices 2006*a-n*. Sometimes a transaction may be split into multiple steps, with each step using a different device. For example, a transaction may be started on a phone and then continued on a computing device, such as a notebook or tablet. Addresses 2007*a-n* are addresses known to be linked to devices 2006*a-n* in prior transactions. Address 2008, for example, is linked to the address of email 2002, but it may be different from address 2005 given for the current transaction. Also shown is additional information such as credit card (CC) information 2003 and phone information 2004. Any other information that can be linked, directly or indirectly, to the current transaction 2001 is shown as co-related information 2009*a-n*. Such information may include, for example, additional addresses for the entity enacting the current transaction, from any place around the world, and any other information that could link the current transaction and its enactor to any known bad or suspicious actor.

Figure 21:
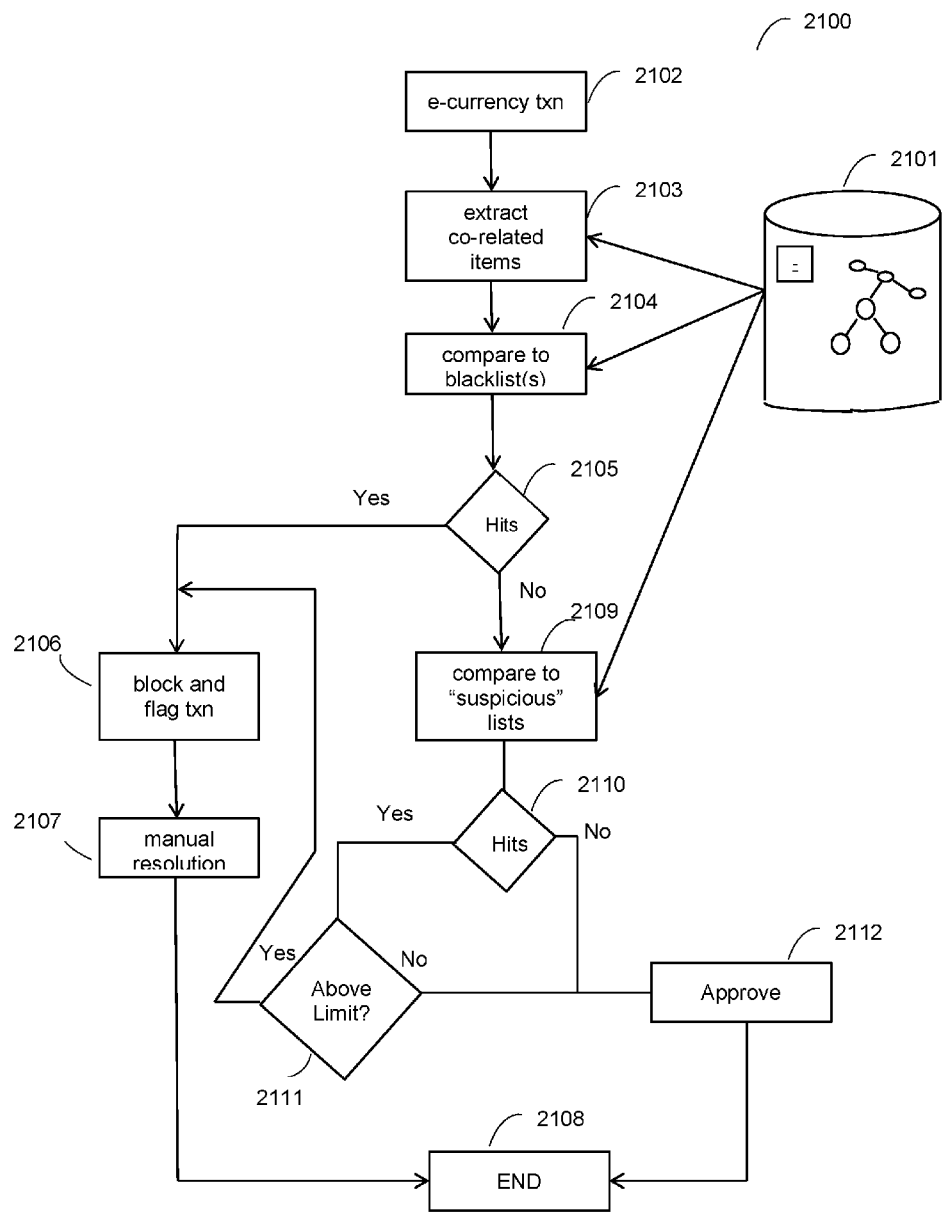
FIG. 21 is a block diagram illustrating an exemplary process for reviewing a transaction according to an embodiment.

FIG. 21 shows an exemplary process 2100 for reviewing a transaction for anti-fraud, anti-money-laundering, and other related issues, according to one aspect of the system and method disclosed herein. In step 2102 an e-currency transaction is reviewed. In step 2103 co-related items are extracted from data store 2101, as described above in the discussions of FIGS. 19 and 20. These related items are typically stored in a non-SQL big database that, in this example, has a graph format; hence the data is shown as graphs in FIGS. 20 and 21. However, there is no reason the data should be limited to graphical databases; it may be stored in ordinary tables or other suitable database types. In step 2104 the system compares those items to known blacklists stored in data store 2101, and in step 2105 the system checks to see if any of the elements are a hit on any item(s) in any blacklist. If the system finds one or more hits (yes), the process branches to step 2106, where the transaction is blocked and flagged for review. In step 2107 the problem is resolved by manual review. In some cases, where a transaction appears to be flagged due to only a simple mistake, a redress process, either manual or automatic, may be used. For example, if a transactor has the same name as a person on a blacklist, but no other data matches, the transactor may be issued a redress number by the relevant authorities for the affected jurisdiction(s), and using the redress number, the transactor may automatically be cleared. If the transactor has no redress number, he must apply for manual resolution. Once the manual resolution is finished, the process ends in step 2108.

If, in step 2105, the system finds no items on a known blacklist (no), in step 2109, the system compares transaction items to items on suspicious lists, also extracted from data store 2101. Suspicious lists are based on previous transactions, wherein a transactor may have some slight degree of relationship (third, fourth, or fifth degree) to a suspect, that is, a person on a blacklist, but only on a single item, so it could be not a real relationship. For example, if a transactor used a computer in a library that was previously used by a suspect, the transactor may have one common item with the suspect, namely, that specific device, but no other relationship. However, if a transactor consistently uses the same computer as a suspect, the system would assign a higher threshold of suspicion to the transactor. Further, based on a hit with a suspect entity, the breadth or depth (n links on graph from origin) of the co-related items looked at is expanded by an additional number, and if that results in more suspicious connection, a transaction is rejected and sent for manual review. So, if in step 2110, the system determines there was a hit on the suspect list (yes), then in step 2111 system checks against some predetermined limits of suspicion threshold, number of connections, and transaction value. If the number of hits is above the limit (yes), the process branches back to step 2106. If the number of hits is below the limits (no), or if in step 2110 the system determines there are no hits on the suspect list (no), the system approves the transaction in step 2112 and in step 2108 the process ends. Various techniques may be used to correlate or cluster(ize) items in order to find reasons for approval, rejection or whether further investigation is needed. These techniques for example may include but not limited to such as correlating attributed eDNA information, heuristics, statistical analysis, access to third-party databases, history of transactions, level of KYC that has been performed on the user and or wallets, etc.

Sanction Review

The intent of sanctions screening is to compare individuals and business entities against available lists that describe regulatory sanctions. Regulations governing detailed reviews, particularly reviews of financial situations and transactions may, in the cases of a truthful (accurate) match against such lists, prevent a regulated entity (typically a person or institution reviewing or asked to review a proposed transaction) from further analyzing a proposed transaction, and in some cases stop said proposed transaction. It must be understood that in this context the definition of a "proposed transaction" is broad and does not necessarily include movement of money. For example, "proposed transaction" can be an onboarding process (or a third-party review during such a process), say, for issuing a loan or a lease to an apartment, or opening some other kind of account or process. Not all lists that are part of sanctions imply denying services. Lists containing, for example, names of politically exposed persons (PEPs) imply that the reviewing entity needs to perform enhanced due diligence (EDD) on the individual or the business. But such EDD doesn't mean that business can't happen.

The key point is in the operational effect of the analysis, which analysis may reduce both false positives and false negatives, but can also be used as an indication of risk. It is important to emphasize the intent of these lists, in general: to reduce the likelihood of money laundering and terrorism financing.

On the false positive side, the graph of attributes is used to compare additional data that further define the entry in the list against the content of the graph itself. Typically, during the comparison, the system looks for either confirmation or evidence against the matching. From this angle the system is looking to truly understand whether the subject in question matches or not.

In addition, the graph is also used, as indicated in the text, so that potential connections to untrustworthy attributes can be used to elevate the risk and as such the institution may decide not to take a transaction, but it may not necessarily imply that it was a true hit against the sanction list. The opposite is also true, the relation to trustworthy attributes may direct the institution to accept a transaction, but again not necessarily implying that it wasn't a truthful match.

The graph is also particularly important in enhancing the politically exposed persons (PEP) verification. PEP is a list built based on guidelines. In general, entries in the PEP list are "political" influential people, their immediate families, and their business associates. Developing such list is particularly difficult when it comes to the definition of business associates, as the meaning of that term (business associate) is vaguely defined. So, the graph can be used as an individual or business extension that is constructed based on observation of actual financial transactions, and therefore truthful to the intent of the guideline.

Typically, in some cases a computerized sanction screening system may comprise an automated system for collection of sanction information, plus a routine for analyzing additional available data related to sanction information entities. Said system may also include an automated analysis summary routine for creating condensed information subsets or graphlets containing relevant information about sanction entities, some of which can be entities themselves, organized in a data retrieval system, such that an automated transaction system can check data from transactions and automatically identify and flag potentially sanctioned transactions. Then upon exceeding a preset contextual limit, a potential blocking warning is issued. Further, the computerized sanction screening system reviews a flagged transaction cluster and, if items do not contain links to a known bad entity, the system may accept the transaction. However, if the system finds reason to suspect an entity or to require contextually EDD (see above), the breadth of the co-related items looked at is expanded by an additional number, and if the system then finds one or more potentially suspicious connections, the transaction is rejected or put on hold and sent for further manual review, which review tries to offset a linked suspected bad entity with a preset minimum of known good entities for approval, and if that preset minimum is not reached the transaction is referred for manual review.

Figure 22:
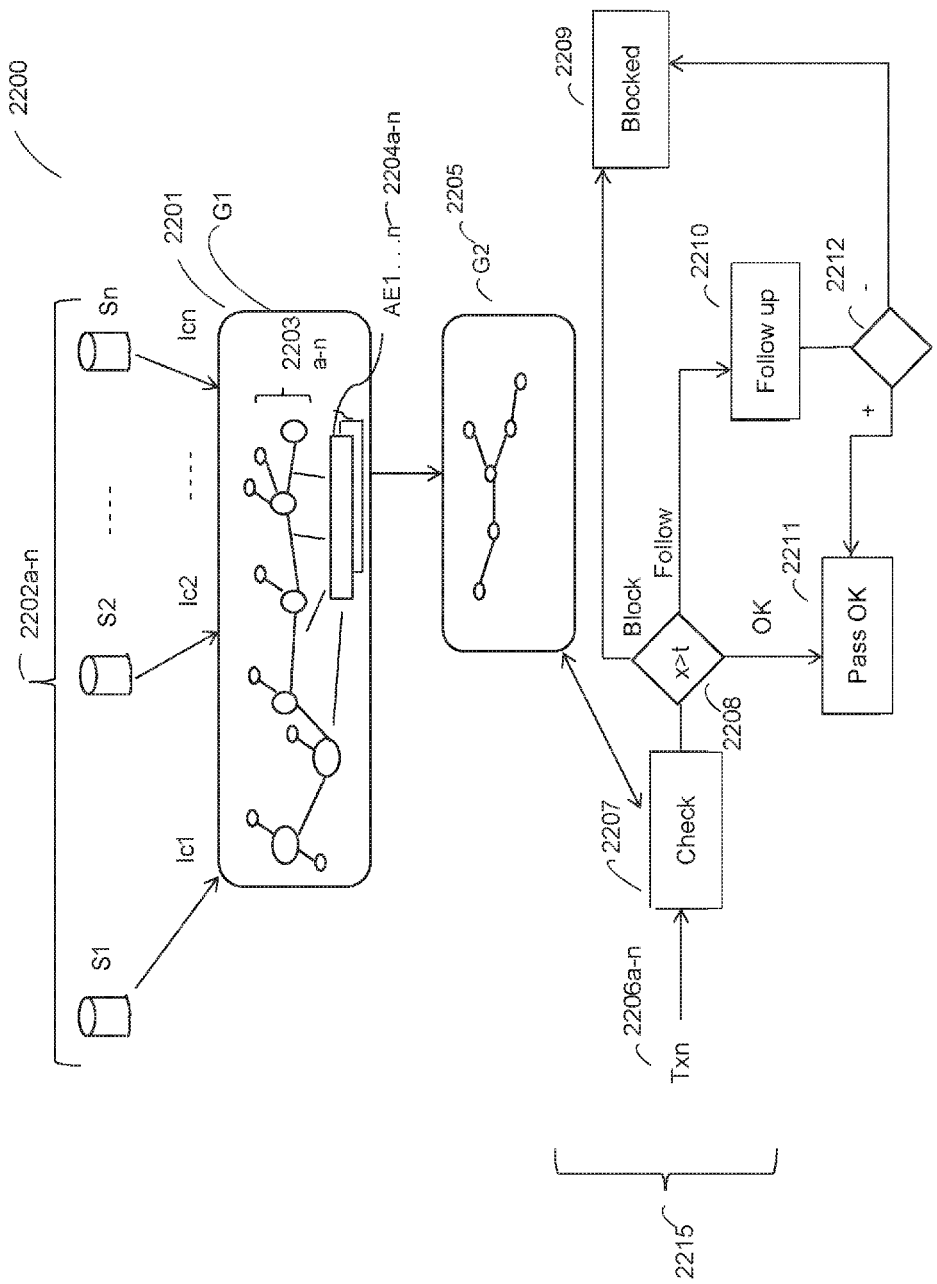
FIG. 22 is a block diagram illustrating another exemplary process for reviewing a transaction according to an embodiment.

FIG. 22 illustrates an exemplary process 2200 for screening sanction sources according to one aspect of the system and method disclosed herein. Multiple sources S1-Sn 2202a-n are different sanction databases of different governments and/or other regulatory governmental and nongovernmental agencies that are involved in issuing sanctions against, typically, money laundering, but in some cases other illicit economic activities, including but not limited to bribery, human trafficking, etc. Information from those different sources is pulled together with ingest connectors IC1-ICn into graph system 2201 that contains one major graph G1 containing subsets or subgraphs or graphlets 2203a-n. Out of these subsets, the system, using intelligence preprocessing, extracts objects AEI-n 2204a-n, which are pre-configured for quick comparisons. Those objects 2204a-n are then used for comparisons when the system checks transactions, as shown in process 2215. Transactions Txn 2206a-n enter the system and are checked in step 2207. A graph G2 2205 is created that shows the objects, persons, or other items—in general the nearby environment of entities connected to the transaction being checked. The system compares the entities in graph G2 2205 to those pre-created objects AE1-n 2204a-n. If the system, in step 2208, finds a high similarity, it blocks the transaction and sends it to step 2209, where the process ends with the transaction blocked. If, in step 2208, the system finds no similarity or very low similarity, in step 2211 the transaction is passed OK. If, in step 2208, the system finds a medium similarity, it marks the transaction for follow-up in step 2210. This follow-up may be an enhanced machine check as described in co-pending application Ser. Nos. 14/845,613 and 14/846,169 (and discussed herein) that expands for additional checks, or it may be a combination machine and/or manual check. After further determination, the transaction may be cleared (based, for example, on a "known good") or rejected (based on a "known bad"), and only those cases that cannot be properly cleared or rejected are passed on for manual inspection, thus dramatically reducing the volume of cases requiring manual inspection. In step 2212, based on the expanded follow-up, the system makes a final determination whether this transaction can pass and sends it on to step 2211, or is rejected and sent it to step 2209.

The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Just as an example, recent (e.g., in last 2 to 6 months) use of a shipping address or phone number or device ID with a Bad transaction or attempt may lead the system to reject the transaction immediately. In most cases, legitimate users would contact the vendor and try to resolve the problem, thus moving that user into a higher reputation score bucket.

In some cases, a computerized anti-fraud payment system may analyze transaction data, automatically rejecting some transactions and assigning some others for manual review while others for additional automatic review, according to a set of rules, automatically accepting some of the reviewed transactions also according to rules. The review rules may accept transactions for the following reasons: Transaction uses prepaid cards and the bank has authorized the transaction; there is a history of the card being used with the consumer account, and there is no history of chargebacks or refunds; the address associated with the consumer's phone number matches the billing address associated with the payment and the consumer responds affirmatively to an automated phone call; the shipping address matches the address associated with the consumer's phone number; there is a positive, non fraud, match between the physical contact information provided in the transaction and a third-party service; and there is a positive, non fraud, match between the email contact information provided and the physical contact information for the transaction in a third-party service. Additional items may include but are not limited to such as a low transaction value, an in-depth KYC analysis has previously been performed on the user, an element of the transaction is on a whitelist, the transaction is a subscription renewal for a transaction that was previously non-fraudulent, a similar transaction, with the same suspicious characteristics, was previously manually reviewed and accepted by a human reviewer. Further, the system may be configured to filter transactions based on transaction value and type of goods prior to acceptance rules. Additionally, the system may store a user's electronic signature associated with prior transaction(s) and compare it to the electronic signature used in the transaction currently under review, and then accept or reject the transaction depending on whether the signatures match. Other elements of comparison between past and current transactions may include a browser fingerprint, a computer fingerprint, an IP address, geographic IP location information, information associated with a payment, a typing pattern, user name, user billing address, user shipping address, user phone number, email address, or account name. The browser fingerprint may include a user agent, a screen resolution, a software plug-in, a time zone, a system language, whether Java is enabled, whether cookies are enabled, a site visited, or an IP address. Similarly, the computer fingerprint may include processor characteristic, a memory size of the machine, a value that is loaded at a key location, a value of a registry of a loaded operating system, an Ethernet MAC address, raw networking information, network information, a loaded program, or a log file. And the network information may include a network provider, whether an IP address is consistent with a known IP address, geographical proximity of an address registered with a payment instrument and the IP address as determined by an IP to geo-location service, whether or not a proxy is in use, whether a known bad IP address is in use, and whether the IP address is associated with a service provider who was associated with the user in the prior transaction.

To provide additional context for various aspects of the present invention, the following discussion is intended to provide a brief, general description of a suitable computing environment in which the various aspects of the invention may be implemented. While some exemplary embodiments of the invention relate to the general context of computer-executable instructions that may run on one or more computers, those skilled in the art will recognize that the invention also may be implemented in combination with other program modules and/or as a combination of hardware and software.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is also within the scope of the disclosure that a user may enter commands and information into the computer through one or more wired/wireless input devices, for example, a touch-screen, a keyboard and a pointing device, such as a mouse. Other input devices may include a microphone (functioning in association with appropriate language processing/recognition software as know to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

In some cases, a computerized anti-money-laundering payment system may comprise software for analyzing transaction data that can identify closely related payments tabulate the amounts of transfers in a cluster of closely related payments, so that if the transfers exceed a preset limit, the system issues a warning. Further, in some cases, the system executes a reputation review, which may result in flagging of a transaction cluster, and may (or may not) accept transactions if transaction data does not link to a known bad player, bad address, or bad phone numbers and does not exceed preset limits. Also, if the system detects association with a suspect entity, the breadth of the co-related items looked at is expanded by an additional number, and if that results in more suspicious connection, a transaction is rejected and sent for manual review.

In some cases a computerized sanction screening system may comprise an automated system for collection of sanction information, plus a routine for analyzing additional available data related to sanction information entities. Said system may also include an automated analysis summary routine for creating condensed information subsets or graphlets containing relevant information about sanction entities, some of which can be entities themselves, organized in a data retrieval system, such that an automated transaction system can check data from transactions and automatically identify and flag potentially sanctioned transactions. Then upon exceeding a preset contextual limit, the system does not in all cases block a transaction, but issues a blocking warning, meaning the transaction needs to be further investigated, manually or automatically. Further, the computerized sanction screening system reviews a flagged transaction cluster and, if items do not contain links to a known bad entity, the system may accept the transaction. However, if the system finds reason to suspect an entity, the breadth of the co-related items looked at is expanded by an additional number, and if the system then finds one or more suspicious connections, the transaction is rejected and sent for further review, which review tries to offset a linked suspected bad entity with a preset minimum of known good entities for approval, and if that preset minimum is not reached the transaction is referred for manual review.

While exemplary embodiments have been set forth above for the purpose of disclosure, modifications of the disclosed embodiments as well as other embodiments thereof may occur to those skilled in the art. Accordingly, it is to be understood that the disclosure is not limited to the above precise embodiments and that changes may be made without departing from the scope. Likewise, it is to be understood that it is not necessary to meet any or all of the stated advantages or objects disclosed herein to fall within the scope of the disclosure, since inherent and/or unforeseen advantages of the may exist even though they may not have been explicitly discussed herein.

What is claimed is:

1. A computerized sanction screening system, comprising:
   a system bus;
   a processing unit coupled with the system bus;
   a network interface coupled with the system bus; and
   a system memory coupled with the system bus and storing executable instructions therein which when executed by the processing unit cause the system to:
      collect, via the network interface, sanction information from a plurality of sources having sanction databases of agencies that are involved in issuing sanctions against illicit economic activities, wherein the sanction information identifies sanction entities;
      store, in a database, historical cryptocurrency transaction data containing attributes of past cryptocurrency transactions recorded by one or more of a cryptocurrency exchange, a cryptocurrency ledger, and a know-your-customer facility that are related to the sanction entities identified in the sanction information collected from the plurality of sources;
      generate one or more electronic fingerprints for each of the sanction entities, wherein an electronic fingerprint for a sanction entity is based on one or more of the past cryptocurrency transactions;
      generate, from analyzing the historical cryptocurrency transaction data, first graph data representing a first graph connecting one or more of the attributes of the past cryptocurrency transactions stored in the database, wherein the first graph data connects the sanction entities to potentially exposed persons via the connected one or more attributes of the past cryptocurrency transactions and wherein the first graph data is generated based on the generated one or more electronic fingerprints;
      extract, using an automated analysis summary routine, data representing a plurality of graphlets from the first graph data, the plurality of graphlets data containing relevant information extracted from the first graph data associated with the sanction entities;
      store, in a data retrieval system, the plurality of graphlets data;
      analyze a plurality of proposed current cryptocurrency transactions to generate second graph data, the second graph data connecting one or more objects, persons and items to a current cryptocurrency transaction of the plurality of proposed current cryptocurrency transactions being analyzed, the one or more objects, persons and items that are connected to the current cryptocurrency transaction being analyzed in the second graph data representing an environment for the current transaction being analyzed;
      determine a similarity between the environment represented by the second graph data and a corresponding environment represented by a graphlet of the plurality of graphlets data;
      determine whether the determined similarity is a high similarity, a medium similarity, or a low similarity; and
      in response to a determination that the determined similarity is the high similarity, automatically block the current cryptocurrency transaction being analyzed.

2. The computerized sanction screening system of claim 1, wherein the current cryptocurrency transaction being analyzed is cleared when the determined similarity is the low similarity.

3. The computerized sanction screening system of claim 1, wherein the current cryptocurrency transaction being analyzed is further analyzed for acceptance when the determined similarity is the medium similarity.

4. The computerized sanction screening system of claim 3, wherein the current cryptocurrency transaction being analyzed is further analyzed based on a reputation score.

5. The computerized sanction screening system of claim 3, wherein the current cryptocurrency transaction being analyzed is further analyzed based on a count of connections of the current cryptocurrency transaction being analyzed to, within a predetermined breadth or depth in an attribute graph of past cryptocurrency transactions, items that are on a blacklist.

6. The computerized sanction screening system of claim 3, wherein the current cryptocurrency transaction being analyzed is further analyzed based on a count of connections of the current cryptocurrency transaction being analyzed to, within a predetermined breadth or depth in an attribute graph of past cryptocurrency transactions, items on a suspicious list.

* * * * *